United States Patent
Matsuo et al.

(10) Patent No.: US 7,787,479 B2
(45) Date of Patent: Aug. 31, 2010

(54) GATEWAY APPARATUS AND ROUTING METHOD

(75) Inventors: Tomohiro Matsuo, Kobe (JP); Tsuyoshi Takatori, Kobe (JP); Kaoru Noumi, Kobe (JP); Susumu Nishihashi, Kobe (JP); Tomohide Kasame, Kobe (JP); Yukio Ishikawa, Kobe (JP); Junji Takahashi, Kobe (JP); Yasuyuki Umezaki, Kawasaki (JP); Akiko Furuya, Kawasaki (JP); Nobuaki Kawasoe, Kawasaki (JP); Naoto Shimoji, Kawasaki (JP); Masayoshi Kusumoto, Kawasaki (JP)

(73) Assignees: Fujitsu Ten Limited, Kobe (JP); Fujitsu Limited, Kawasaki (JP)

( * ) Notice: Subject to any disclaimer, the term of this patent is extended or adjusted under 35 U.S.C. 154(b) by 605 days.

(21) Appl. No.: 11/412,048

(22) Filed: Apr. 27, 2006

(65) Prior Publication Data

US 2006/0271694 A1    Nov. 30, 2006

(30) Foreign Application Priority Data

Apr. 28, 2005  (JP) ............................ 2005-133443
Jan. 20, 2006  (JP) ............................ 2006-013230

(51) Int. Cl.
*H04L 12/56* (2006.01)
(52) U.S. Cl. ...................... 370/401; 370/413
(58) Field of Classification Search ......... 370/352–356, 370/389, 392, 401, 412, 413
See application file for complete search history.

(56) References Cited

U.S. PATENT DOCUMENTS

| | | | |
|---|---|---|---|
| 4,748,439 A | 5/1988 | Robinson et al. | |
| 5,438,506 A | 8/1995 | Oho et al. | |
| 5,640,399 A | 6/1997 | Rostoker et al. | |
| 5,701,418 A | 12/1997 | Luitje | |
| 5,774,453 A | 6/1998 | Fukano et al. | |
| 5,838,684 A | 11/1998 | Wicki et al. | |
| 5,887,134 A * | 3/1999 | Ebrahim ..................... | 709/200 |
| 5,987,524 A | 11/1999 | Yoshida et al. | |
| 6,044,061 A | 3/2000 | Aybay et al. | |
| 6,088,744 A | 7/2000 | Hill | |

(Continued)

FOREIGN PATENT DOCUMENTS

EP    0 675 024 A1    10/1995

(Continued)

OTHER PUBLICATIONS

"lfind—linear search." *C Standard Function Library Manual*, XP002402513, 1996, http://www.thinkage.ca/English/gcos/expl/c/lib/lfind.html.

(Continued)

*Primary Examiner*—Pankaj Kumar
*Assistant Examiner*—Saba Tsegaye
(74) *Attorney, Agent, or Firm*—Oliff & Berridge, PLC

(57) ABSTRACT

There is provided a gateway apparatus that controls a forwarding process of frame data between multiple communication channels, said gateway apparatus including a search engine that is respectively provided for each of the multiple communication channels to route the frame data between the multiple communication channels, and a first storage portion that is respectively provided for each of the multiple communication channels to temporarily stores the frame data routed.

31 Claims, 35 Drawing Sheets

U.S. PATENT DOCUMENTS

| | | | |
|---|---|---|---|
| 6,282,195 B1 | 8/2001 | Miller et al. | |
| 6,463,067 B1 | 10/2002 | Hebb et al. | |
| 6,553,002 B1 | 4/2003 | Bremer et al. | |
| 6,570,877 B1 | 5/2003 | Kloth et al. | |
| 6,731,097 B1 | 5/2004 | Richards et al. | |
| 6,735,210 B1 | 5/2004 | Lindeborg et al. | |
| 6,768,738 B1 | 7/2004 | Yazaki et al. | |
| 6,785,277 B1* | 8/2004 | Sundling et al. | 370/392 |
| 6,813,266 B1 | 11/2004 | Chiang et al. | |
| 6,847,645 B1 | 1/2005 | Potter et al. | |
| 6,985,484 B1 | 1/2006 | Miller et al. | |
| 7,039,764 B1* | 5/2006 | Shetty et al. | 711/133 |
| 7,274,693 B1* | 9/2007 | Kloth et al. | 370/389 |
| 2001/0023469 A1 | 9/2001 | Jeong et al. | |
| 2001/0038607 A1 | 11/2001 | Honda | |
| 2002/0071422 A1 | 6/2002 | Amicangioli | |
| 2002/0073222 A1 | 6/2002 | Sonoda et al. | |
| 2002/0161881 A1 | 10/2002 | Perkinson et al. | |
| 2002/0163916 A1 | 11/2002 | Oskouy et al. | |
| 2003/0026246 A1* | 2/2003 | Huang et al. | 370/352 |
| 2003/0108038 A1 | 6/2003 | Devanagondi et al. | |
| 2003/0169746 A1 | 9/2003 | Kitazawa et al. | |
| 2004/0095885 A1 | 5/2004 | Yang | |
| 2004/0184479 A1 | 9/2004 | Yamauchi et al. | |
| 2004/0213237 A1 | 10/2004 | Yasue et al. | |
| 2004/0223504 A1 | 11/2004 | Wybenga et al. | |
| 2004/0230749 A1 | 11/2004 | Slegel et al. | |
| 2004/0233920 A1 | 11/2004 | Muranaka et al. | |
| 2005/0050224 A1 | 3/2005 | Palmer et al. | |
| 2005/0063385 A1 | 3/2005 | Wybenga et al. | |
| 2005/0268045 A1 | 12/2005 | Slegel et al. | |
| 2005/0276278 A1 | 12/2005 | Jung et al. | |
| 2006/0036824 A1 | 2/2006 | Greiner et al. | |
| 2006/0083173 A1* | 4/2006 | Jordan et al. | 370/242 |
| 2006/0203721 A1* | 9/2006 | Hsieh et al. | 370/229 |
| 2007/0008927 A1* | 1/2007 | Herz et al. | 370/331 |
| 2007/0286213 A1* | 12/2007 | Fodor et al. | 370/401 |

FOREIGN PATENT DOCUMENTS

| | | |
|---|---|---|
| EP | 0 993 153 A1 | 4/2000 |
| EP | 0 993 219 A1 | 4/2000 |
| EP | 1 001 576 A2 | 5/2000 |
| EP | 1 109 363 A2 | 6/2001 |
| EP | 1 152 574 A2 | 11/2001 |
| GB | 2 398 700 A | 8/2004 |
| JP | 05027975 A * | 2/1993 |
| JP | 10-222535 | 8/1998 |
| JP | A 2003-244187 | 8/2003 |
| JP | 2003-258806 | 9/2003 |
| JP | A 2003-264571 | 9/2003 |
| JP | 2003-298601 | 10/2003 |
| JP | 2004-260365 | 9/2004 |
| WO | WO 87/01221 | 2/1987 |
| WO | WO 99/11000 | 3/1999 |
| WO | WO 99/23853 | 5/1999 |
| WO | WO 99/46903 | 9/1999 |
| WO | WO 00/08801 | 2/2000 |
| WO | WO 00/19661 | 4/2000 |
| WO | WO 2004/023323 A1 | 3/2004 |
| WO | WO 2004/028090 A1 | 4/2004 |
| WO | WO 2005/013143 A2 | 2/2005 |

OTHER PUBLICATIONS

Page 73 and Figs. 3-5 of 10 Gigabit Ethernet Instructional Text, collaborative edited by INOH Chigiri and others, IDG information Communications Series, Japan, IDG Japan, Apr. 2002 (with English translation).

Office Action issued in JP Application No. 2006-013230 on May 11, 2010 (with English translation).

* cited by examiner

FIG. 4

|  | Adress (32bit) | IDE (1bit) | RTR (1bit) | ID (29bit) | MaskInfo (32bit) | CH (8bit) | FIFO.No. (8bit) | DATA LABEL |
|---|---|---|---|---|---|---|---|---|
| Entry1 | 0x***000+000 | 0 | 0 | 0x00000001 | 0x00000000 | 0x01 | 0x00 | 0x00 |
| Entry2 | 0x***000+010 | 0 | 0 | 0x00000002 | 0x00000000 | 0x01 | 0x00 | 0x01 |
| Entry3 | 0x***000+020 | 0 | 0 | 0x00000010 | 0x00000000 | 0x01 | 0x00 | 0x02 |
| Entry4 | 0x***000+020 | 0 | 0 | 0x00000011 | 0x00000000 | 0x02 | 0x01 | 0x03 |
| Entry5 | 0x***000+030 | 0 | 0 | 0x00000020 | 0x00000000 | 0x04 | 0x02 | 0x04 |
| Entry6 | 0x***000+040 | 0 | 0 | 0x00000150 | 0x00000000 | 0x08 | 0x00 | 0x05 |
| Entry7 | 0x***000+050 | 0 | 0 | 0x00000256 | 0x00000000 | 0x01 | 0x01 | 0x06 |
| Entry8 | 0x***000+060 | 0 | 0 | 0x00000333 | 0x00000000 | 0x02 | 0x02 | 0x07 |
| Entry9 | 0x***000+070 | 0 | 0 | 0x00000366 | 0x00000000 | 0x04 | 0x00 | 0x08 |
| Entry10 | 0x***000+080 | 0 | 0 | 0x00000400 | 0x0000000F | 0x01 | 0x01 | 0x09 |
| Entry11 | 0x***000+090 | 0 | 0 | 0x00000621 | 0x00000000 | 0x02 | 0x02 | 0x10 |
| Entry12 | 0x***000+0A0 | 0 | 0 | 0x00000622 | 0x00000000 | 0x01 | 0x00 | 0x11 |
| Entry13 | 0x***000+0B0 | 0 | 0 | 0x00000623 | 0x00000000 | 0x01 | 0x00 | 0x12 |
| Entry14 | 0x***000+0C0 | 0 | 0 | 0x00000651 | 0x00000000 | 0x02 | 0x01 | 0x13 |
| Entry15 | 0x***000+0D0 | 0 | 0 | 0x00000660 | 0x00000000 | 0x04 | 0x02 | 0x14 |
| Entry16 | 0x***000+0E0 | 0 | 0 | 0x00000681 | 0x00000000 | 0x08 | 0x00 | 0x15 |
| Entry17 | 0x***000+0F0 | 0 | 0 | 0x000006F3 | 0x00000000 | 0x01 | 0x02 | 0x16 |
| Entry18 | 0x***000+100 | 0 | 0 | 0x00000700 | 0x000000FF | 0x02 | 0x01 | 0x17 |
| ... | ... | ... | ... | ... | ... | ... | ... | ... |
| Entry29 | 0x***000+1D0 | 0 | 0 | 0x00000777 | 0x000000FF | 0x04 | 0x02 | 0x28 |

FIG. 9A

| IDE | RTR | Res | EXTENDED ID (0 IN STANDARD ID) / STANDARD ID | Res | DLC | Data |
|---|---|---|---|---|---|---|
| 1 BIT | 1 BIT | 1 BIT | 18 BIT / 11 BIT | 4 BIT | 4 BIT | 64 BIT |

FIG. 9B

| IDE | RTR | Res | EXTENDED ID (0 IN STANDARD ID) / STANDARD ID | Res | DLC | Data | DATA LABEL |
|---|---|---|---|---|---|---|---|
| 1 BIT | 1 BIT | 1 BIT | 18 BIT / 11 BIT | 4 BIT | 4 BIT | 64 BIT | 8 BIT |

# GATEWAY APPARATUS AND ROUTING METHOD

BACKGROUND OF THE INVENTION

1. Field of the Invention

This invention generally relates to a gateway apparatus mounted on a vehicle and a routing method that relay data between communication networks.

2. Description of the Related Art

In these years, multiple electronic control units (ECUs) are mounted on a vehicle. Referring to FIG. 38, there are provided, for example, an engine ECU, a door control ECU, an air bag ECU, an audio ECU, and a navigation ECU. A gateway apparatus is necessary for routing data so that the ECUs communicate with each other via LANs having different communication protocol and different bit rates. Japanese Patent Application Publication No. 2003-244187 (hereinafter, referred to as Document 1) and Japanese Patent Application Publication No. 2003-264571 (hereinafter, referred to as Document 2) disclose gateway apparatus having a routing function implemented by software.

The gateway apparatus relays data that are sent and received on multiple different network systems, and realizes gateway functions such as a communication protocol conversion and packet filtering. This allows the nodes connected to different network systems to communicate with each other.

The gateway apparatuses disclosed in Document 1 and Document 2, however, have the gateway functions implemented by software. Therefore, as the ECUs are occupied by application other than routing at a high ratio, relay processing is delayed.

In addition, an increased number of channels makes it complicated to search for a channel via which the data is relayed, and needs a longer time for routing. Furthermore, an increased number of frames to be managed needs a longer time to process various information for routing, and increases the waiting time on the gateway apparatus. This degrades throughput. There is another problem that a buffer structure becomes complex so as to suppress frame loss on the gateway apparatus.

SUMMARY OF THE INVENTION

The present invention has been made in view of the above circumstances and provides a gateway apparatus and routing method that improves the routing efficiency.

According to one aspect of the present invention, preferably, there is provided a gateway apparatus that controls a forwarding process of frame data between multiple communication channels. The gateway apparatus includes: a search engine that is respectively provided for each of the multiple communication channels to route the frame data between the multiple communication channels; and a first storage portion that is respectively provided for each of the multiple communication channels to temporarily stores the frame data routed. In accordance with the present invention, the search engine and the first storage portion are respectively provided for each of the multiple communication channels, thereby enabling the routing process in parallel. This does not increase the period necessary for the routing operation, even when the gateway apparatus has multiple communication channels.

According to another aspect of the present invention, preferably, there is provided a gateway apparatus that controls a forwarding process of frame data between multiple communication channels, the gateway apparatus including: a routing portion that routes the frame data on the basis whether the frame data is processed on a controller that employs a program control or the frame data is processed on hardware; a search engine that routes the frame data to be processed on hardware on the basis of a forwarding destination; and a first storage portion that temporarily stores the frame data routed. In accordance with the present invention, it is possible to reduce the processing load on the search engine, by providing the routing portion to route the frame data to the forwarding destination. It is also possible to forward the frame data that should be forwarded to the controller in advance on a priority basis, thereby making the process start time earlier. Such provided routing portion enables the software process by the controller and the hardware process by the search engine to implement in parallel.

According to yet another aspect of the present invention, preferably, there is provided a routing method that controls a forwarding process of frame data between multiple communication channels, the routing method including: routing the frame data received for each of the multiple communication channels independently; and storing the frame data routed in a first storage portion provided for each of the multiple communication channels. In according with the present invention, the frame data retrieved is routed independently on a communication channel basis. This does not increase the time for the routing process, even if multiple communication channels are provided.

According to still another aspect of the present invention, preferably, there is provided a routing method that controls a forwarding process of frame data between multiple communication channels, the routing method including: routing the frame data on the basis whether the frame data is processed on a controller that employs a program control or the frame data is processed on hardware; routing the frame data to be processed on hardware on the basis of a forwarding destination; and temporarily storing the frame data routed.

BRIEF DESCRIPTION OF THE DRAWINGS

Preferred embodiments of the present invention will be described in detail with reference to the following drawings, wherein:

FIG. 4 shows an example of a routing map stored in a map memory in accordance with the first embodiment of the present invention;

FIG. 9A and FIG. 9B show a data structure of frame data in accordance with the first embodiment of the present invention;

DESCRIPTION OF THE PREFERRED EMBODIMENTS

A description will now be given, with reference to the accompanying drawings, of embodiments of the present invention.

First Embodiment

Figure 1:
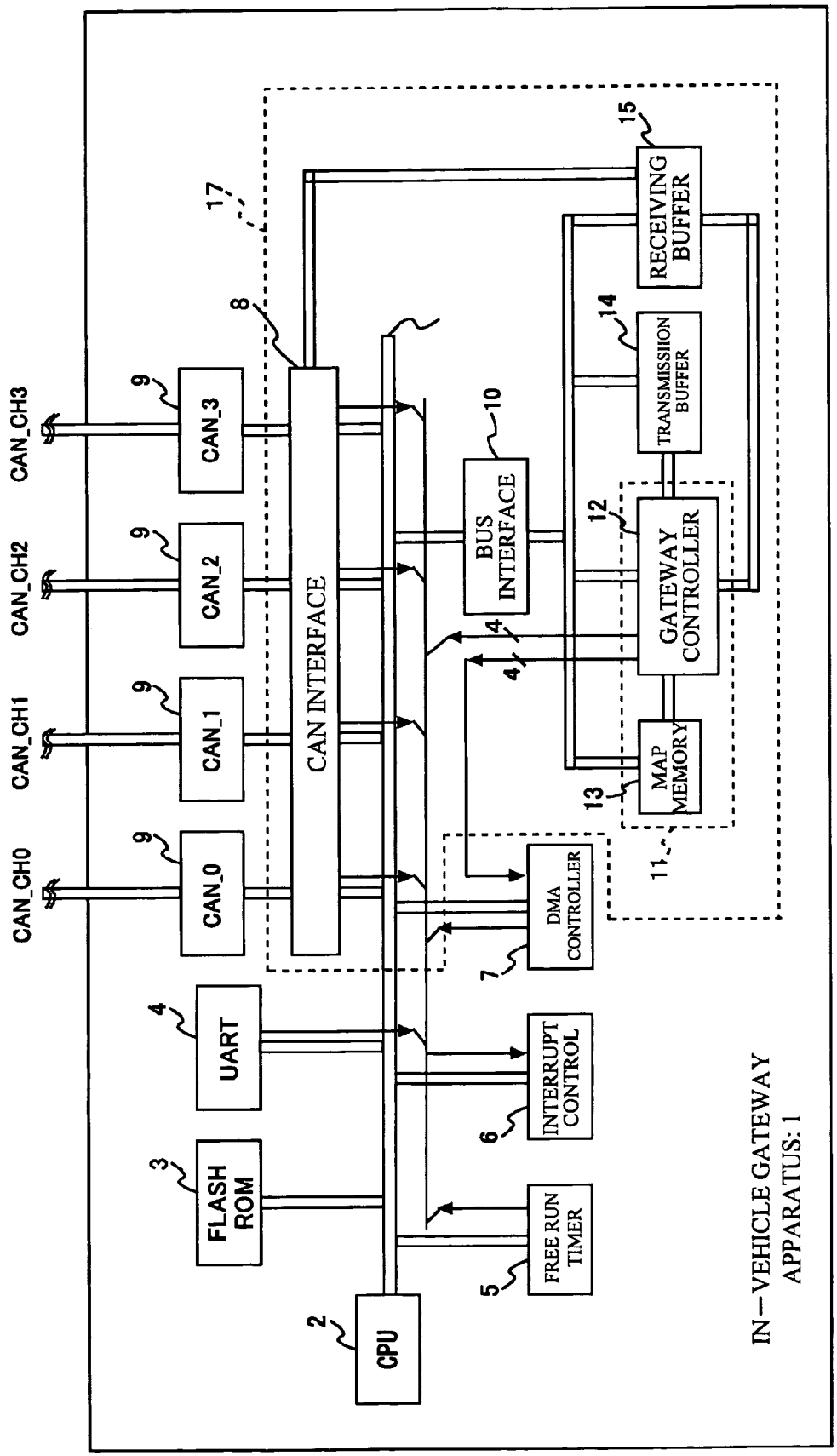
FIG. 1 shows a configuration of a gateway apparatus used in accordance with a first embodiment of the present invention.

Firstly, referring to FIG. 1, a first embodiment of the present invention will be described. FIG. 1 shows a configuration of a gateway apparatus employed in accordance with the first embodiment of the present invention. The first embodiment an in-vehicle gateway apparatus, in which communications take place using a Controller Area network (CAN) protocol. An in-vehicle gateway apparatus 1 has a CPU 2 serving as a controller. The CPU 2 is connected with a flash read only memory (ROM) 3, a universal asynchronous receiver transmitter (UART) 4, a free run timer 5, an interruption controller 6, a DMA controller 7, a CAN interface 8, multiple CANs 9, and a bus interface 10. The structure shown in FIG. 1 has four CANs, namely, CAN_0, CAN_1, CAN_2, and CAN_3. However, an arbitrary number of CANs may be used. The bus interface 10 is connected with a search engine 11, a transmission buffer 14, and a receiving buffer 15. The search engine 11 includes a map memory 13 and a gateway controller 12. The search engine 11, the transmission buffer 14, and the receiving buffer 15 are connected by a data line, which carries data supplied to and from a CPU bus 16 via the bus interface 10. The search engine 11 and the transmission buffer 14 are connected by another data line. The search engine 11 and the receiving buffer 15 are connected by yet another data line. The receiving buffer 15 is connected with the CAN interface 8 by a further data line so that data can be directly applied to the receiving buffer 15 from the CAN interface 8. FIG. 1 also shows control lines that send and receive control signals, in addition to the above-mentioned data lines. The CPU 2 outputs signals that control the above-described functional components onto the control lines. Another control line is provided between the DMA controller 7 and the gateway controller 12 so that the DMA controller 7 reads the data out of the gateway controller 12 and transfers such read data to a forwarding destination, without the control of the CPU 2. Hereinafter, a gateway hardware macro portion 17 denotes a configuration that includes the search engine 11, the map memory 13, the transmission buffer 14, the receiving buffer 15, the bus interface 10, and the CAN interface 8.

The gateway hardware macro portion 17 is mainly provided with the functions described below. Firstly, when the gateway hardware macro portion 17 is booted and the in-vehicle gateway apparatus 1 is reset, the gateway hardware macro portion 17 transfers a routing map, as will be described later in detail. A register, not shown, stores information on whether or not the routing map is normally transferred. As soon as the routing map transfer is completed, the gateway hardware macro portion 17 implements a verification process, that is, checks whether or not there has been an error at the time of writing the routing map. If there is an error, a rest operation is implemented to transfer the routing map again. Secondly, to receive the frame data, the gateway hardware macro portion 17 identifies an interrupt signal as a trigger, and then retrieves the frame data from a message box of the CAN 9. Thirdly, the gateway hardware macro portion 17 performs a routing process of such received data. Fourthly, the gateway hardware macro portion 17 detects an error such as a routing error or the like. In addition to the above-described functions, the gateway hardware macro portion 17 may be provided with a forwarding function of the data after the routing process.

The flash ROM 3 stores data or program to be used when the CPU 2 implements various processes that include a data transmission process. The CPU 2 controls the whole in-vehicle gateway apparatus 1 shown in FIG. 1, and implements a forwarding process of the frame data routed by the gateway controller 12, by means of the program control.

The UART 4 is connected to an external device, and converts a parallel signal sent from the external device into a serial signal. The UART 4 also converts the serial signal sent from a serial device into the parallel signal. The free run timer 5 is a timer (counter) and repeats counting up, while receiving clock signals. The free run timer 5 counts a holding time from the time when the frame data is received and the routing process is performed on the gateway controller 12 to the time when the frame data is forwarded to a forwarding destination, so as to detect a delay of the frame data.

The interruption controller 6 controls an output of the interrupt signal to the CPU 2, the interrupt signal having been output from the search engine 11. The gateway controller 12 outputs an interrupt signal to the CPU 2, when a predetermined number of frames are stored in the transmission FIFO memories (first storage portion) 21, when the transmission FIFO memories 21 are overflowed, or when a routing error occurs on the search engine 11. The DMA controller 7 performs a DMA transfer of the frame data stored in the transmission FIFO memories 21, by means of the routing process of the search engine 11, without involving the CPU 2.

Multiple CANs 9 (CAN_0, CAN_1, CAN_2, and CAN_3) are respectively provided for communication channels to store the frame data received from a CAN bus, not shown, or stores the frame data after the routing process is implemented on the gateway controller 12. The frame data is routed and read out of the message box, and is output to the CAN bus. Upon receiving the frame data from the communication channel, the CAN 9 outputs an interrupt signal to the gateway controller 12 of the search engine 11.

The search engine 11 identifies an interrupt signal output from the CAN 9 as a trigger, acquires the frame data from the message box of the CAN 9, and temporarily stores the frame data in the receiving buffer 15 via the CAN interface 8. The search engine 11 retrieves the frame data from the receiving buffer 15 at a given clock timing, implements processes such as the routing process, an information search process of a destination to which the frame data is relayed to, and the like. The gateway controller 12 is implemented by hardware. The routing map stored in the map memory 13 will be described later in detail.

The frame data that has been routed by the gateway controller 12 is stored in the transmission buffer 14. The frame data that has been read from the message box of the CAN 9 is stored in the receiving buffer 15.

Figure 2:
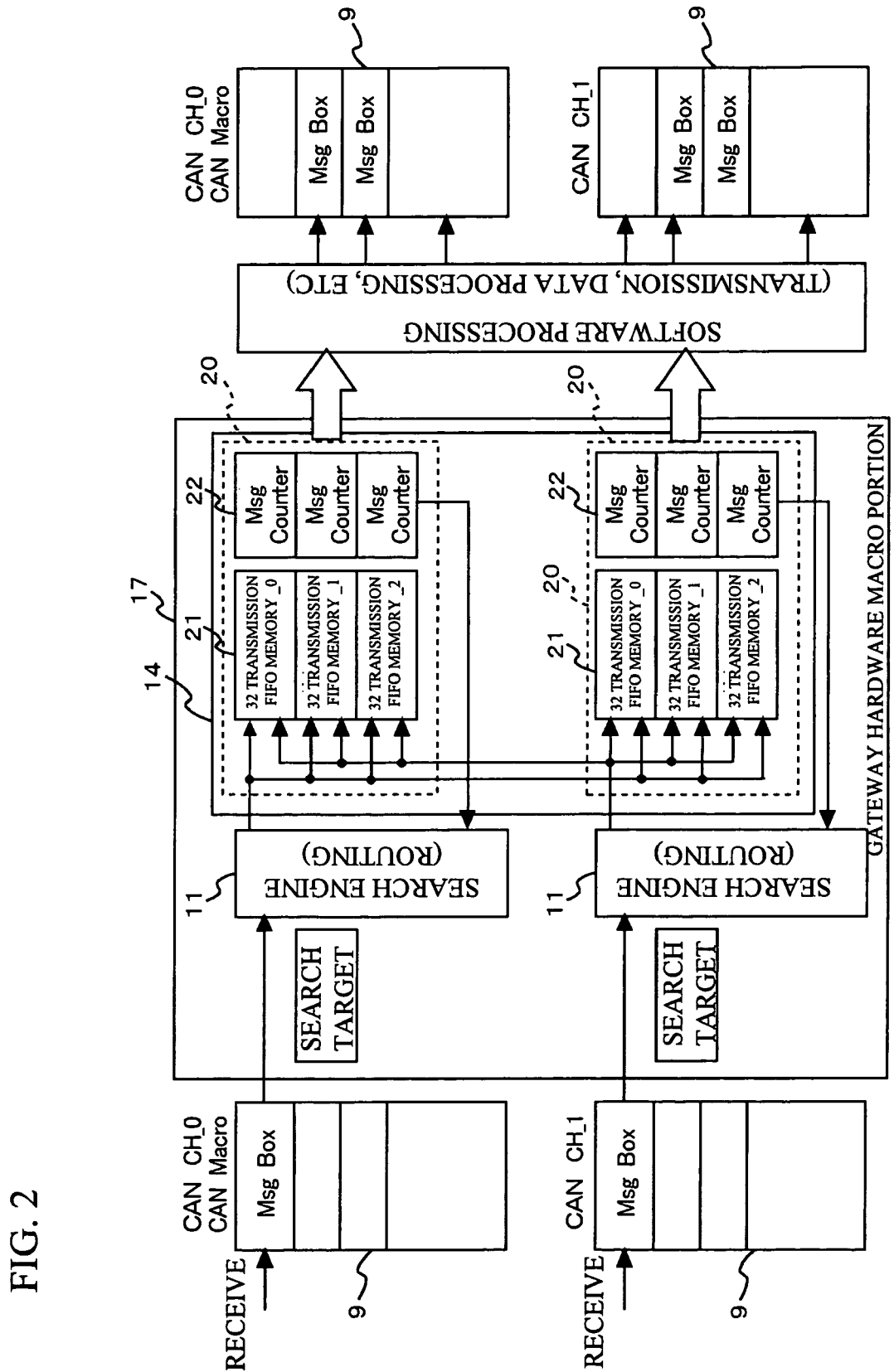
FIG. 2 shows a configuration of a gateway controller in accordance with the first embodiment of the present invention.

Referring now to FIG. 2, the gateway hardware macro portion 17 is described. The gateway hardware macro portion 17 includes the search engine 11 and a transmission FIFO memory unit 20. The transmission FIFO memory unit 20 includes the transmission FIFO memories 21 and a message counter 22. The transmission FIFO memory unit 20 is provided in the transmission buffer 14. As shown in FIG. 2, each of the search engines 11 is provided for a respective one of the receiving channels. Three transmission FIFO memories 21 and three message counters 22 are provided for each channel. In accordance with the present embodiment, the three FIFO memories 21 are exclusively used for normal transmission, priority transmission, and determination processing, respectively, according to the functionalities thereof. The transmission FIFO memory 21 dedicated to the determination processing is used for processing the ID or data or checking the content of the data.

The search engine 11 acquires the frame data from the message box of the associated CAN 9, and stores such acquired frame data in the receiving buffer 15, as shown in FIG. 2. Then, the search engine 11 reads the frame data out of the receiving buffer 15 at a given timing for routing, and stores such routed frame data in the transmission FIFO memory 21. One message box is provided for receiving in each CAN 9, and other message boxes can be used arbitrarily, as shown in FIG. 2.

Figure 3:
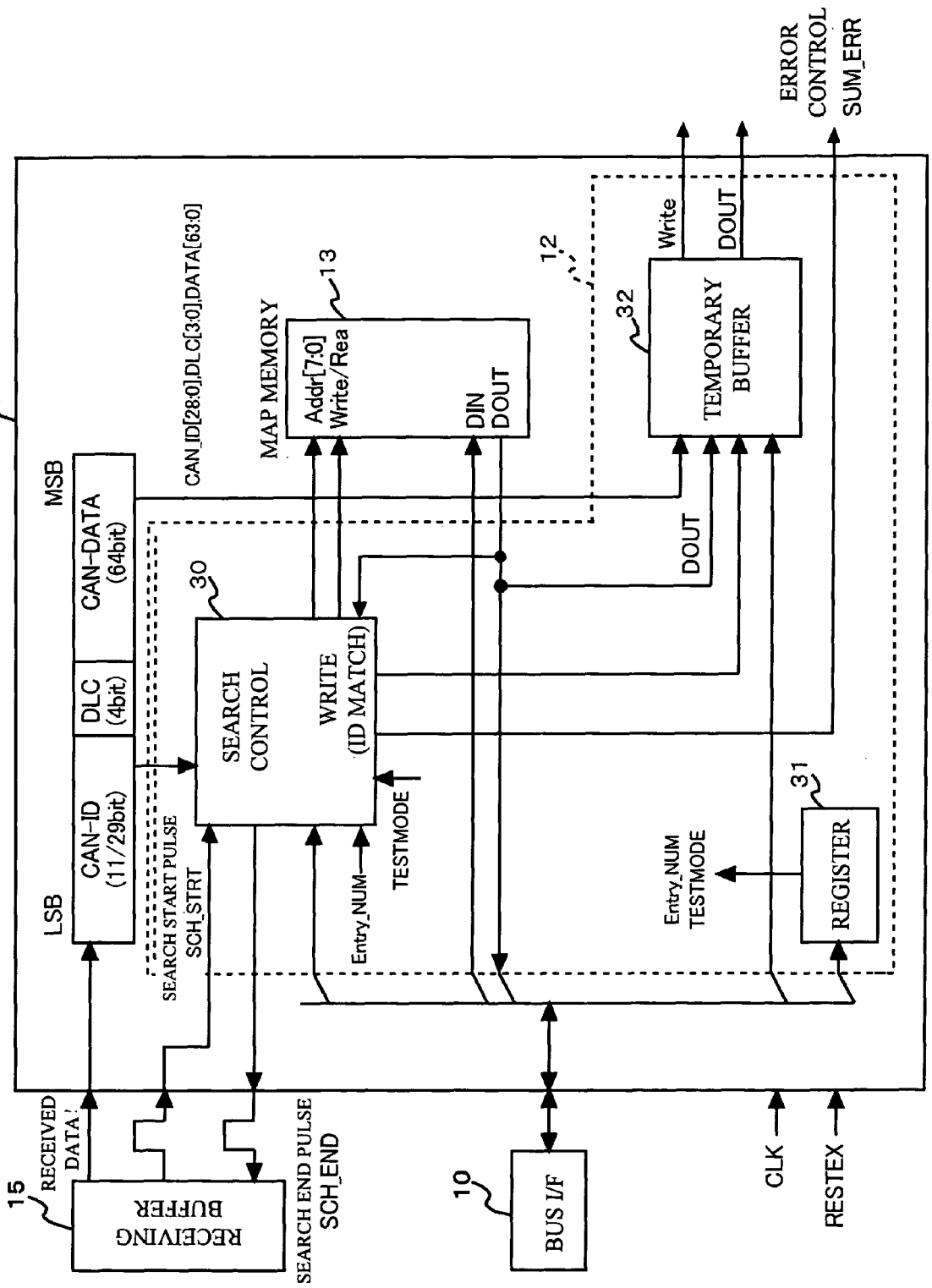
FIG. 3 shows a configuration of a search engine in accordance with the first embodiment of the present invention.

Now, referring to FIG. 3, a configuration of the search engine 11 is described. The search engine 11 includes a search controller 30, the map memory 13, a register 31, and a temporary buffer 32. The search controller 30, the register 31, and the temporary buffer 32 correspond to the gateway controller 12 shown in FIG. 1. FIG. 3 shows only one search engine 11 and one transmission FIFO memory unit 20. However, there are actually provided multiple search engines 11 and transmission FIFO memory units 20, as shown in FIG. 2.

The search controller 30 operates as a functional component that implements the routing process of the frame data. The search controller 30 retrieves the frame data stored in the receiving buffer 15 at a given timing, and implements the routing process on the frame data. FIG. 3 shows the data to be loaded to the search controller 30. CAN_ID, DLC, CAN-DATA are loaded to the search controller 30. The map memory 13 has a routing map that is used by the search controller 30 for routing. The routing map is defined for each channel that forwards the data, and the information of the routing map is defined in such a manner that the data received on each channel is forwarded to one or more different channels. FIG. 4 shows an example of the routing map. Each entry of the routing map has a memory address that stores the information, an IDE that represents the format type, an RTR that represents the frame type, an ID, mask information, channel information, a transmission FIFO memory No., and a data label as another piece of information.

The temporary buffer 32 temporarily stores the frame that has been routed to the forwarding destination by the search controller 30. The setting information of the search controller 30 is stored in the register 31. The CPU 2 sets the setting information. For example, the temporary buffer 32 stores information that designates suspension, start, and reset of functions of the search controller 30, information that sets validity and invalidity of the search controller 30 for each channel, definition information of a routing error shown in Table 1, information that sets whether or not a source of trouble should be notified to the CPU 2, if there is an overflow error or a routing error in the transmission FIFO memories 21. Here, the overflow error in the transmission FIFO memories 21 denotes that new data is written into a corresponding one of the transmission FIFO memories 21 in a state where there is no available space in the involved transmission FIFO memory 21, and the newest data is overwritten into the oldest stage thereof. The routing error denotes that the frame data cannot be written into the corresponding transmission FIFO memory 21 that is set as a forwarding destination, because the transmission FIFO memory 21 is set invalid.

TABLE 1

| Phenomenon | Operation of Gateway Controller | Notification to CPU |
|---|---|---|
| Designation channel is not specified (all bits: 0) | Discard frame | Yes |
| Designation channel set as invalid is specified | Nothing | No |
| Transmission FIFO memory is not specified (all bits: 0) | Discard frame | Yes |
| Specified transmission FIFO memory is set as invalid | Discard frame | Yes |
| 1 is specified to set at reserved bit of destination channel | Ignore any specification for reserved bit | No |
| 1 is set at reserved bit of transmission FIFO memory | Ignore any specification for reserved bit | No |
| Bit is overlapped between ID and mask information | Nothing | No |
| Multiple transmission FIFO memories are specified (two or more bits: 1) | Forward to specified and lowermost bit | No |
| Bus is off | Nothing | No |
| SUM error | Nothing | Yes |

Figure 5:
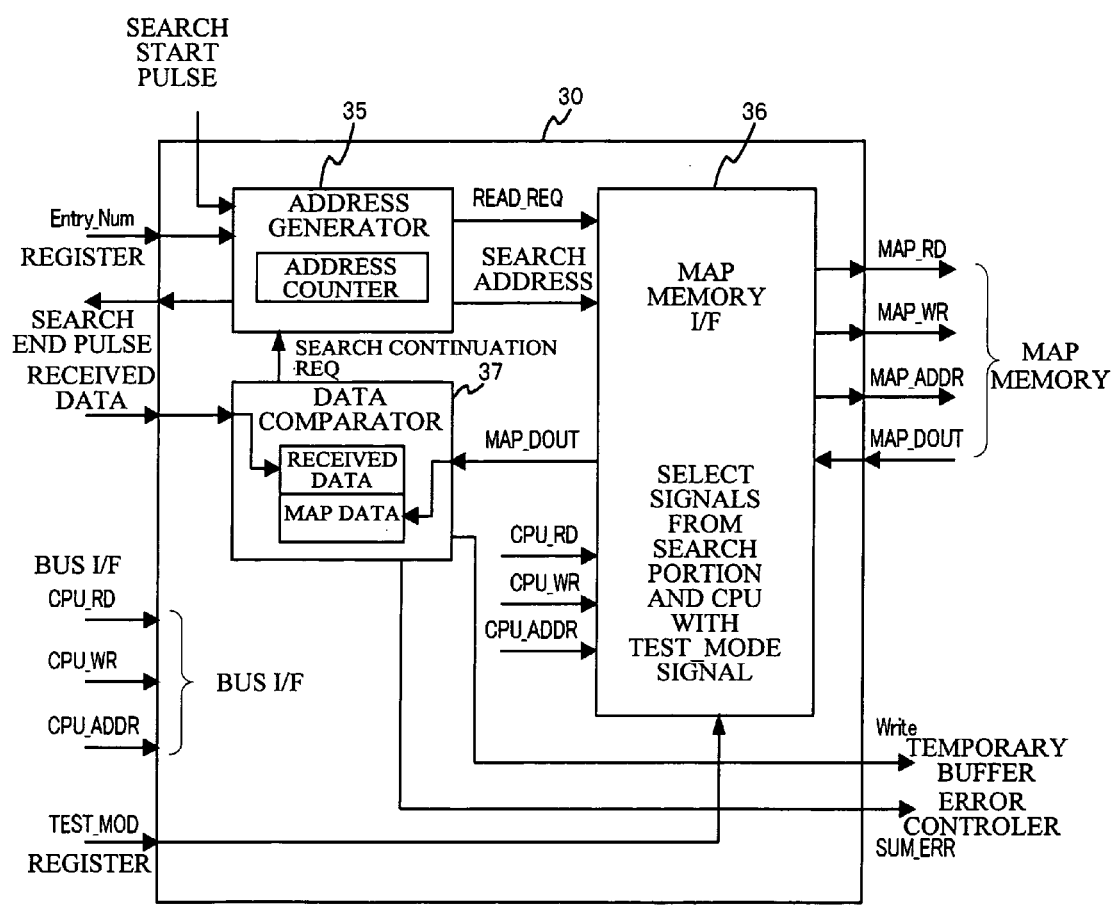
FIG. 5 shows a configuration of a search controller in accordance with the first embodiment of the present invention.

Now, referring to FIG. 5, a configuration of the search controller 30 is described. The search controller 30 includes functional components of an address generator 35, a map memory I/F portion (routing map portion) 36, and a data comparator 37. The address generator 35 includes an address counter to sequentially generate an address in the map memory 13. The map memory I/F portion 36 serves as an interface with the map memory 13 to read the address data that has been generated by the address generator 35 from the map memory 13 and output to the data comparator 37. The data comparator 37 compares to determine whether or not there is an address, registered in the routing map of the map memory 13, which corresponds to the data (CAN_ID) loaded from the receiving buffer 15.

Figure 6:
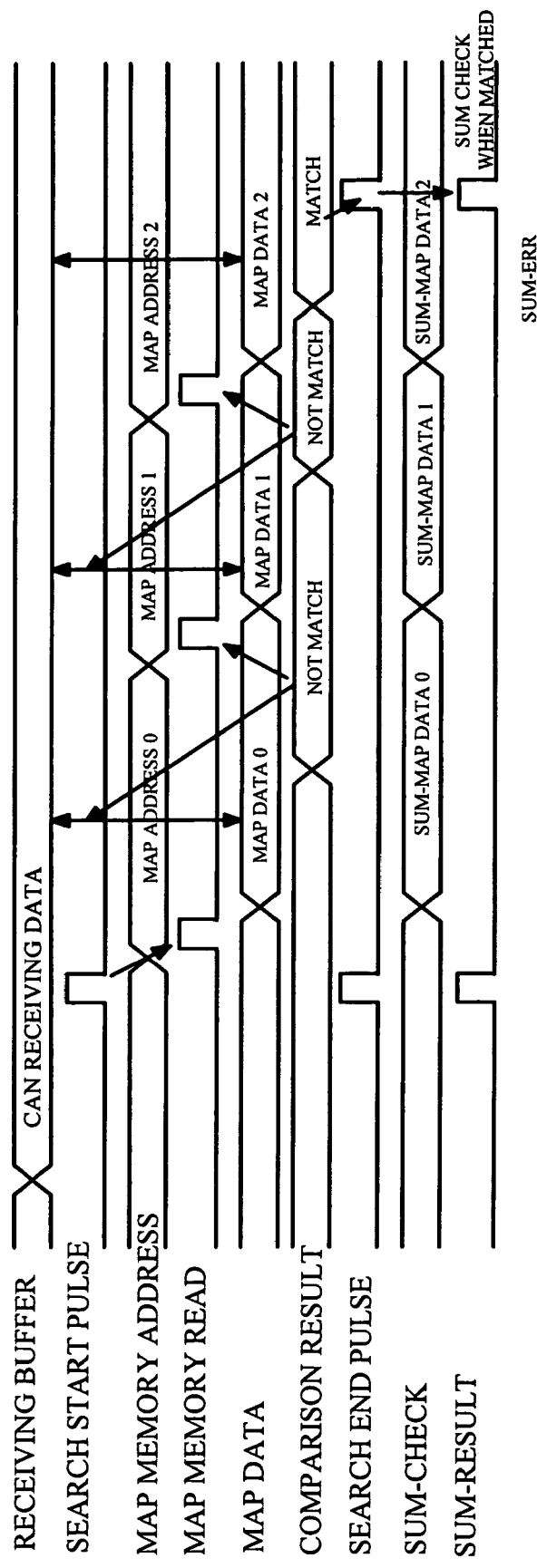
FIG. 6 is a time chart showing an operation timing of the search controller in accordance with the first embodiment of the present invention.

Referring to a timing chart shown in FIG. 6, an operation timing of the search controller 30 is described. When the received data of the CAN 9 is stored in the receiving buffer 15, a search start pulse is applied to the address generator 35 from the receiving buffer 15. The address generator 35 identifies the search start pulse as a trigger, and sequentially generates the addresses in the map memory 13. The addresses are shown in FIG. 6 as map addresses 0, 1, 2, and . . . . The map address generated by the address generator 35 is input into the map memory I/F portion 36, and the map data is retrieved from the map memory 13 in synchronization with a map memory READ signal. The map data is shown in FIG. 6 as map data 0, 1, 2, and . . . . The data comparator 37 compares the received data (CAN_ID) and the ID retrieved from the map memory 13 to determine whether or not the IDs are identical. If the IDs are not matched, a search continue request signal is output from the data comparator 37 to the address generator 35 to continue the data comparison. If the IDs are matched, the search continue request signal is no longer out-put to the address generator 35. The address generator 35 outputs a search end pulse. The data comparator 37 implements a SUM check of the routing map together with the data comparison. The data comparator 37 firstly calculates SUM values of the data such as CAN_ID, the mask information, the destination channel, the transmission FIFO memory number, and the data label, stored in the entry having such matched ID, and then compares the SUM values with check values included in the routing map. If the SUM value and the check value are different, the data comparator 37 determines that there is a routing error and outputs a SUM_ERR signal that indicates an error to the CPU 2.

Figure 7:
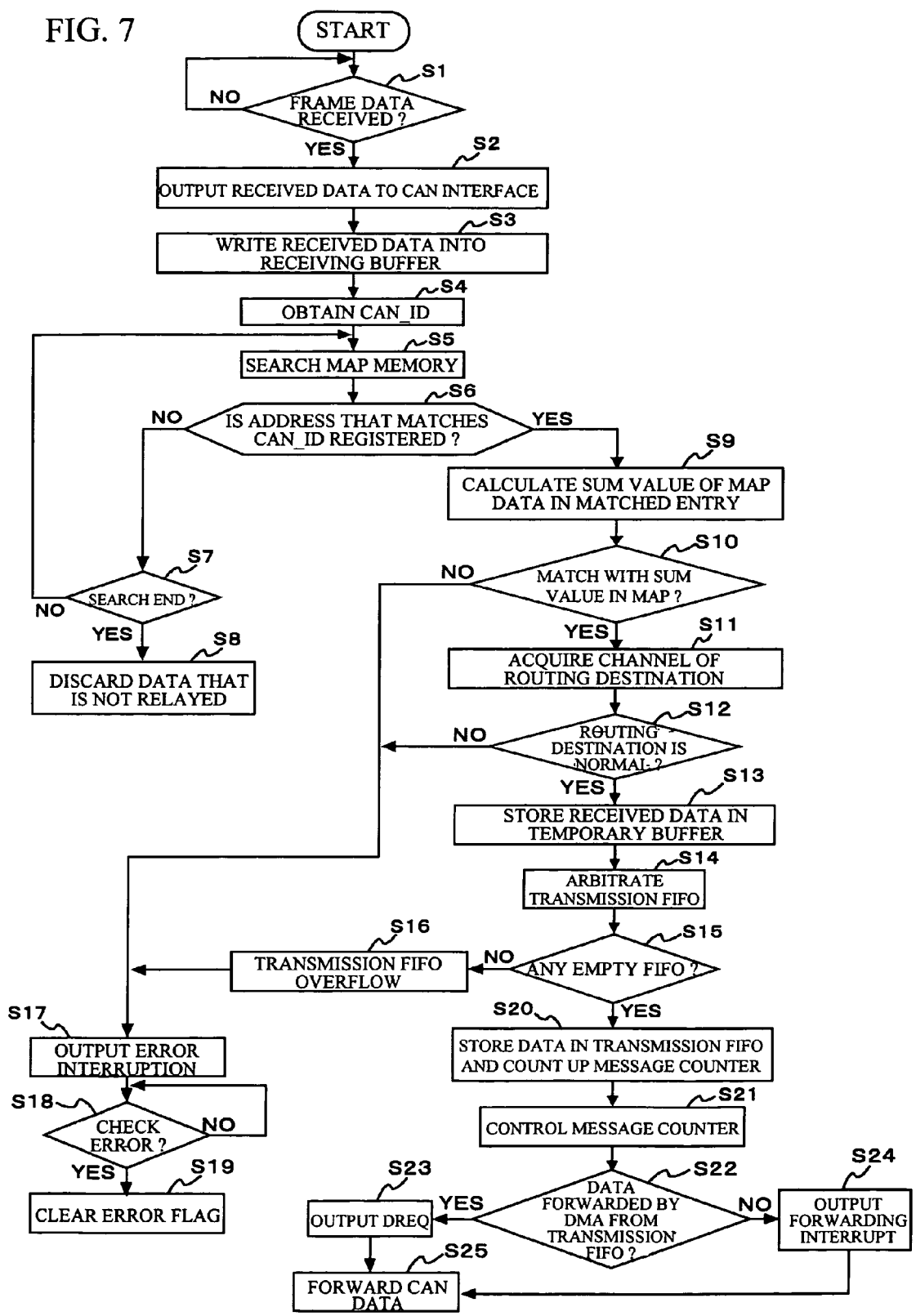
FIG. 7 is a flowchart showing an operation timing of the search controller in accordance with the first embodiment of the present invention.
Figure 8:
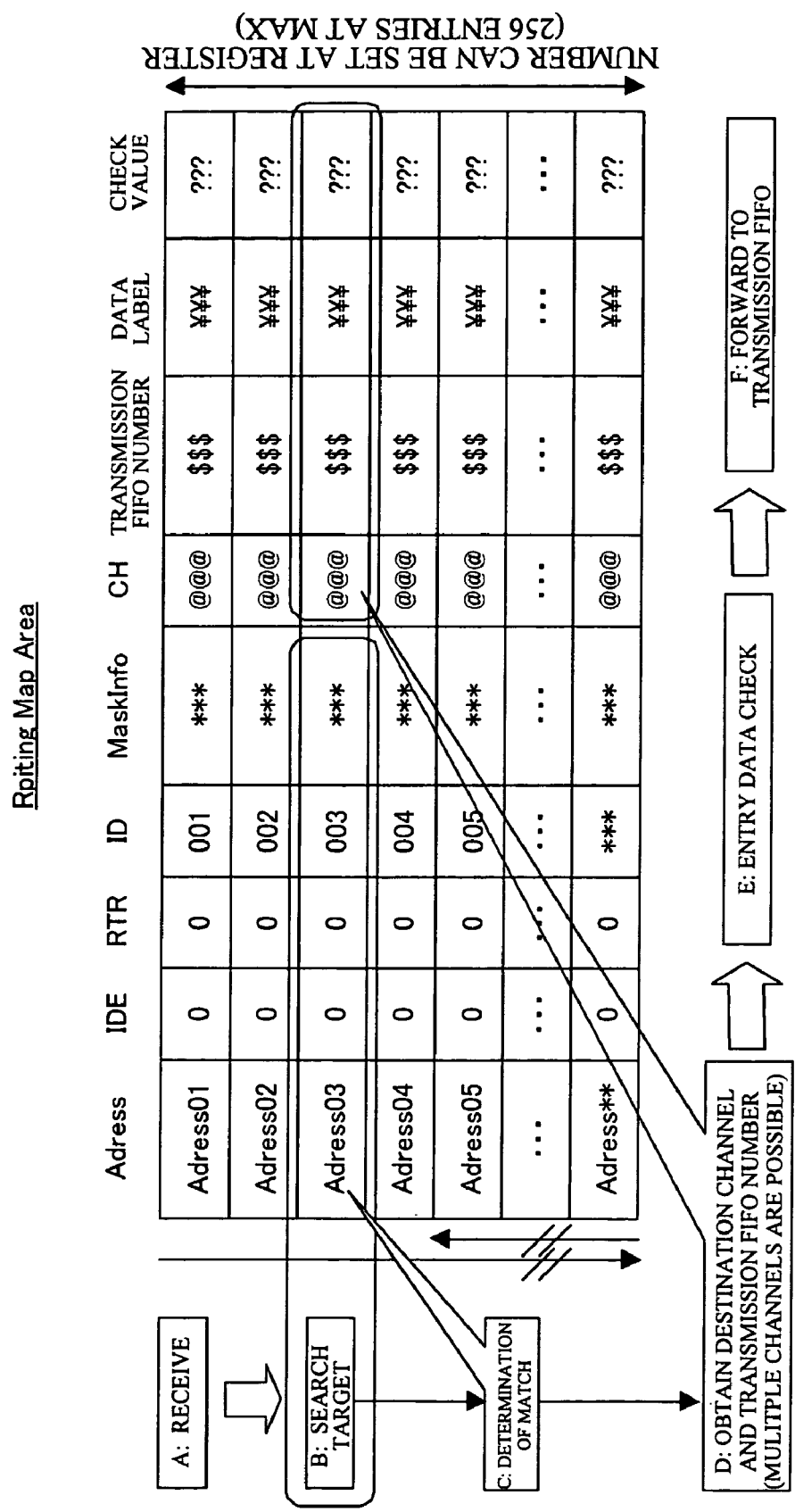
FIG. 8 conceptually shows an operation of a search controller in accordance with the first embodiment of the present invention.

An operation procedure is described, with reference to FIG. 7 and FIG. 8. The operation procedure does not describe the control procedure of the CPU 2 but describes the hardware operation of the gateway hardware macro portion 17. FIG. 8 conceptually shows the routing map stored in the map memory 13 and the routing procedure of the search controller 30 that uses the afore-mentioned routing map. Upon receiving the frame data (YES at step S1 in FIG. 7 and A: Receive in FIG. 8), the gateway hardware macro portion 17 outputs such received frame data to the CAN interface 8 (at step S2). The frame data is written into the receiving buffer 15 from the CAN interface 8 (at step S3). When the CAN 9 inputs the frame data into the message box included in the CAN 9, the CAN 9 outputs an interrupt signal to the gateway controller 12. The search engine 11 identifies the interrupt signal as a trigger, retrieves the frame data from the message box, and stores the frame data in the receiving buffer 15. The search engine 11 acquires the CAN_ID, Data Link Control (DLC), and the data in synchronization with a search start pulse received from the receiving buffer 15 (at step S4). All the frame data stored in the receiving buffer 15 is considered to be the search target, and is input into the search engine 11. FIG. 9A shows a data structure of such received frame data. The frame data includes IDE (that represents the format type), RTR (that represents the frame type), a standard ID or extended ID, DLC, and the data. The standard ID or extended ID is referred to as CAN_ID.

The search engine 11, with reference to the map memory 13, determines whether or not the received frame is the data that should be routed. This is shown as B (Target of Search) and C (Determination to be Identical) in FIG. 8. The search engine 11 acquires the CAN_ID, DLC, and the data from the frame data, and then searches the map memory 13 (at step S5). The search engine 11 determines whether or not the routing map stores the ID matched with the CAN_ID (at step S6). If there is no ID matched with the CAN_ID in the routing map (NO at step S6), the search engine 11 further determines whether or not it is a search end (at step S7). If it is not a search end (NO at step S7), the map memory 13 is searched again from step S5 to determine whether or not the ID matched with the CAN_ID is registered in the map memory. If it is a search end (YES at step S7), the data frame is discarded because the data is not a target to be relayed (at step S8).

Figure 10:
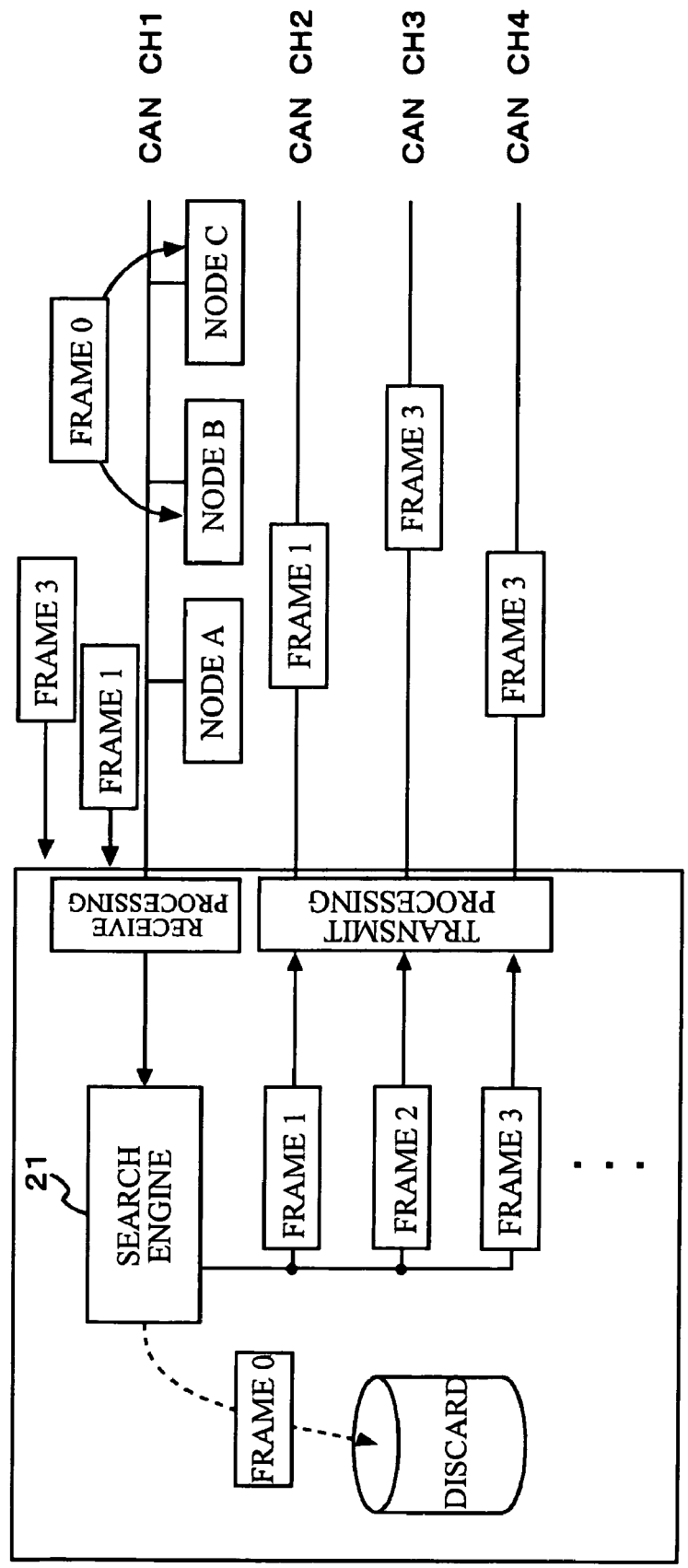
FIG. 10 conceptually shows an operation of the search engine in accordance with the first embodiment of the present invention.

If the routing map includes the ID matched with the CAN_ID, as shown in FIG. 8 (YES at step S6 and C: Determination of Match), a SUM check of the routing map is carried out (at step S9 and E in FIG. 8). Firstly, calculated are the SUM values of the data, such as CAN_ID, the mask information, the destination channel, the transmission memory area FIFO number, and the data label, stored in the entry having the matched ID (at step S9), and then such calculated SUM values are compared with check values included in the routing map (at step S10). If the SUM value and the check value are different, it is determined there is a routing error (NO at step S10) and a SUM_ERR signal that indicates an error is output to the CPU 2 as an interrupt signal (at step S17). Subsequently, when the CPU 2 confirms this error (YES at step S18), an error flag is cleared (at step S19). All the frame data stored in the message boxes of the CAN 9 is considered to be the search target. Accordingly, referring to FIG. 10, the frame sent and received between nodes on a single channel is also stored in the message box. However, the search engine 11 discards the frame that does not have to be routed.

If the SUM check is successful (YES at step S10), the search engine 11 acquires a destination channel from the routing map (at step S13). After determining the destination channel, the search engine 11 checks whether the destination channel is valid or invalid. If the target channel is determined invalid (NO at step S12), an interrupt signal is output to the CPU 2 to notify that there is a routing error (at step S17). If the target channel is determined valid (YES at step S12), the data label is added to the frame data and the frame data is output to the transmission FIFO memory 21 (at step S13), as shown in FIG. 9B. If there is a contention between the channels, the frame data is temporarily stored in the temporary buffer 32.

The frame data temporarily stored in the temporary buffer 32 is written into the transmission FIFO memory 21 by arbitration of a FIFO arbitration unit (first arbitration unit) 23, while the FIFO arbitration unit 23 is also arbitrating the frame output from another search engine 11 (at step S14). The FIFO arbitration unit (first arbitration unit) 23 will be described later in detail. In the transmission FIFO memories 21, the number of stages is set for the frame data that can be stored. If the frame data is forwarded to the transmission FIFO memory 21 with exceeding the number of stages, there is no longer an empty stage or area in the transmission FIFO memories 21. If the frame data is written in a state where there is no empty stage in the transmission FIFO memories 21 (YES at step S15), the newest frame data is overwritten into the oldest stage in the transmission FIFO memory 21, resulting in an overflow of the transmission FIFO memories (at step S16). When the search engine 11 determines that there is an overflow in any of the transmission FIFO memories 21, the search engine 11 outputs an interrupt signal of overflow error to the CPU 2 (at step S17). Subsequently, when the CPU 2 confirms the above-mentioned error (YES at step S18), the error flag is cleared (at step S19). The data label added to the frame data on the search engine 11 will be described later in detail.

If an empty stage is available in the transmission FIFO memory 21 of interest (YES at step S15), the frame data is written into the transmission FIFO memory 21 by means of the arbitration of the FIFO arbitration unit 23 and the message counter 22 starts counting up (at step S20). If the count value of the message counter 22 reaches a predetermined value (at step S21), the search engine 11 outputs an interrupt signal to the CPU 2. If the data forward is implemented by means of the control of the DMA controller 7 (YES at step S22), a data request signal (DREQ) is output to the DMA controller 7 (at step S23). The DMA controller 7 to which the signal is input transmits the data received from the transmission FIFO memory 21 (at step S25). If the data forwarding is controlled by the CPU 2, the search engine 11 outputs a forwarding interrupt signal to the CPU 2 (at step S24). The CPU 2 implements a forwarding process of the frame data that has been routed on a software process by means of the program control (at step S25 and F in FIG. 8). The free run timer 5 counts the holding time from the time when the frame data is received and the routing process is performed on the search engine 11 to the time when the frame data is forwarded to a forwarding destination. The CPU 2 detects a delay of the frame data.

Figure 11:
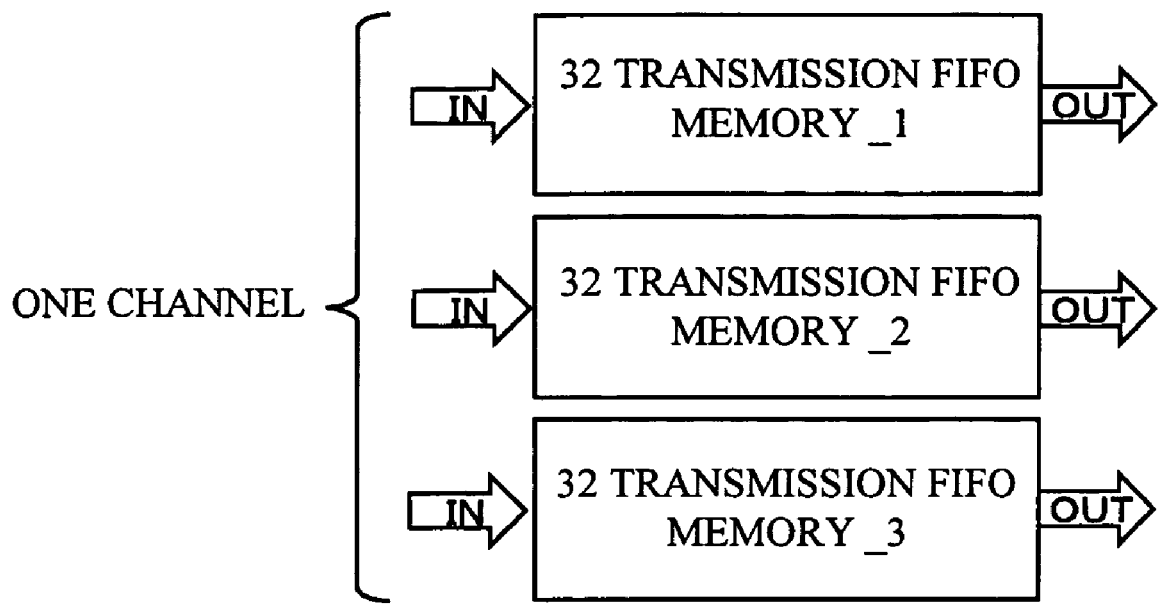
FIG. 11 shows a configuration of transmission FIFO memories on one channel in accordance with the first embodiment of the present invention.

FIG. 11 shows a configuration of the transmission FIFO memories 21. Each channel includes three 32-stage transmission FIFO memories 21. In accordance with the present embodiment, one stage of each FIFO memory 21 is capable of storing information equal to one frame. The number of stages of each FIFO memory 21 and the number of lines thereof are not limited to the structure shown in FIG. 11, but may be changed arbitrarily according to the number of frames, the number of channels, or the communication speed.

Figure 12:
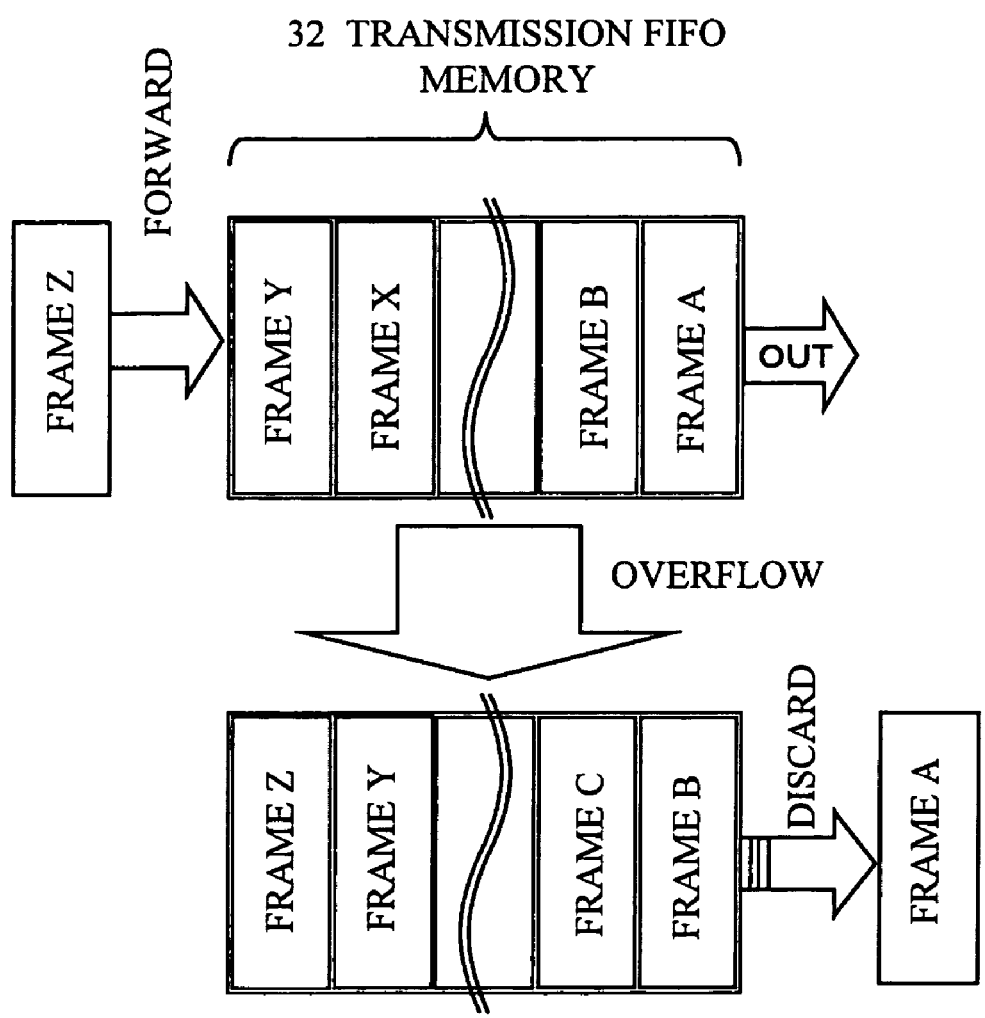
FIG. 12 shows a process when the transmission FIFO memories are overflowed in accordance with the first embodiment of the present invention.

The frame data buffered in the transmission FIFO memories 21 are counted by the respective message counters 22 and are then displayed. The count value on the message counter 22 represents the number of frames that are allowed to retrieve from the associated transmission FIFO memories 21. If the count value of the message counter 22 reaches the value set on the register 31, the search engine 11 outputs an interrupt signal to the CPU 2. The CPU 2 is capable of acquiring the frame equal in number to the count value, from the transmission FIFO memories 21. Upon receiving the interrupt signal, the CPU 2 reads the count values of the message counters 22 of all the corresponding FIFO memories 21 by means of the software process of the program control to detect which transmission FIFO memory 21 should be read and how many times the transmission FIFO memory 21 should be read. Also, if the frame data is not read out of the transmission FIFO memory of interest 21 for some reason and the transmission FIFO memory 21 is full, the oldest frame data is discarded from the FIFO memory 21 and the newest one is written into the transmission FIFO memory 21, as shown in FIG. 12.

The frame data stored in the transmission FIFO memories 21 are written into the receiving buffer 15 by means of the software process of the program or by means of the forward control of the DMA controller 7. Also, a process that cannot be standardized as a gateway apparatus such as, for example, a fail process, the CAN_ID, data processing, or the like is also carried out by means of the software process. The software process is realized such that the CPU 2 reads the program stored in the ROM 3 and implements the process according to the program.

Figure 13:
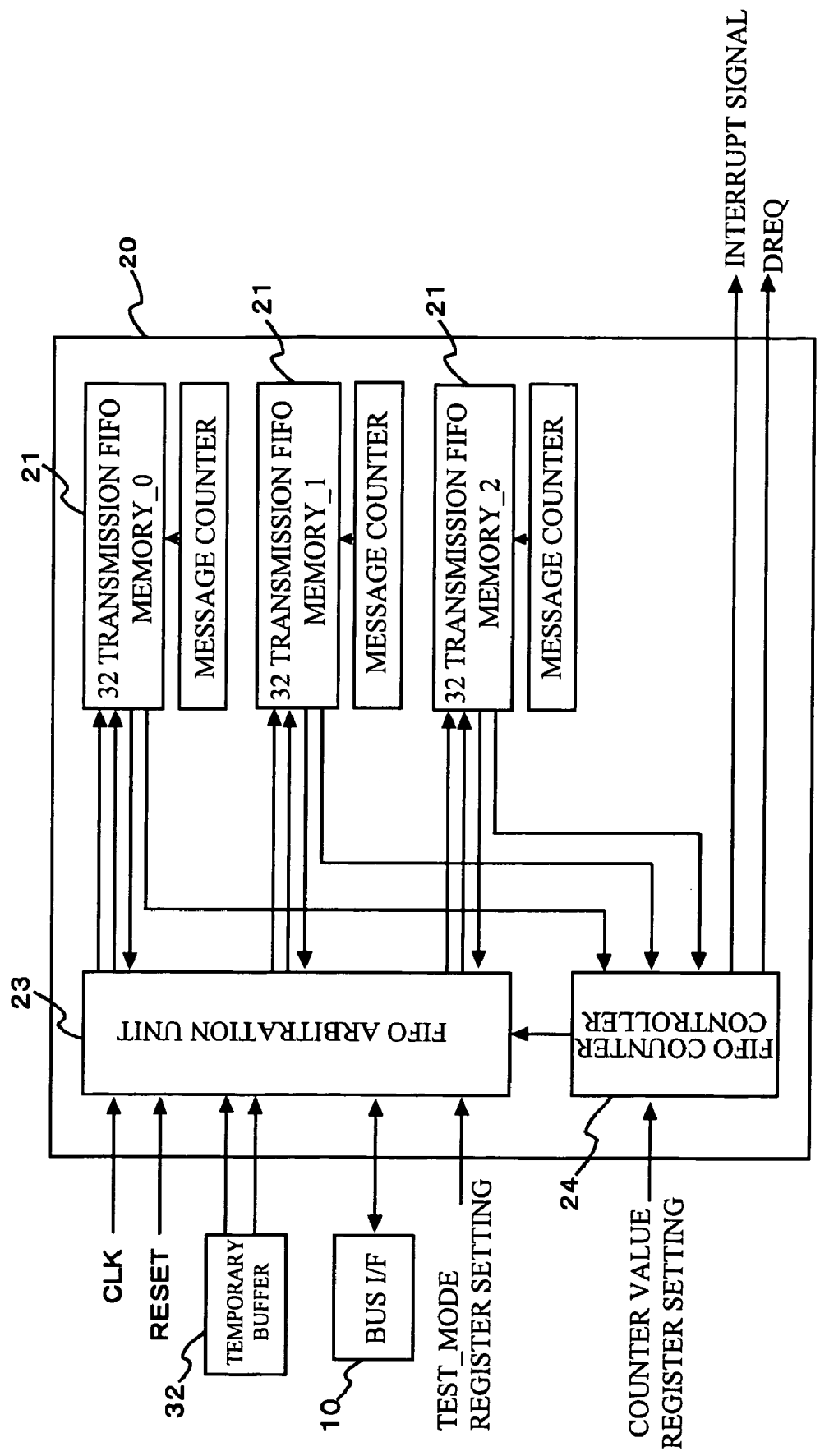
FIG. 13 shows a configuration of a transmission FIFO memory unit in accordance with the first embodiment of the present invention.

FIG. 13 shows a configuration of the connection between the FIFO arbitration unit (first arbitration unit) 23 and the transmission FIFO memories 21. A FIFO counter controller 24 in FIG. 13 controls the message counter 22. If multiple pieces of frame data are simultaneously output from multiple search engines 11, the FIFO arbitration unit 23 outputs the frame data to the transmission FIFO memory 21, in accordance with a priority that has been set.

Figure 14:
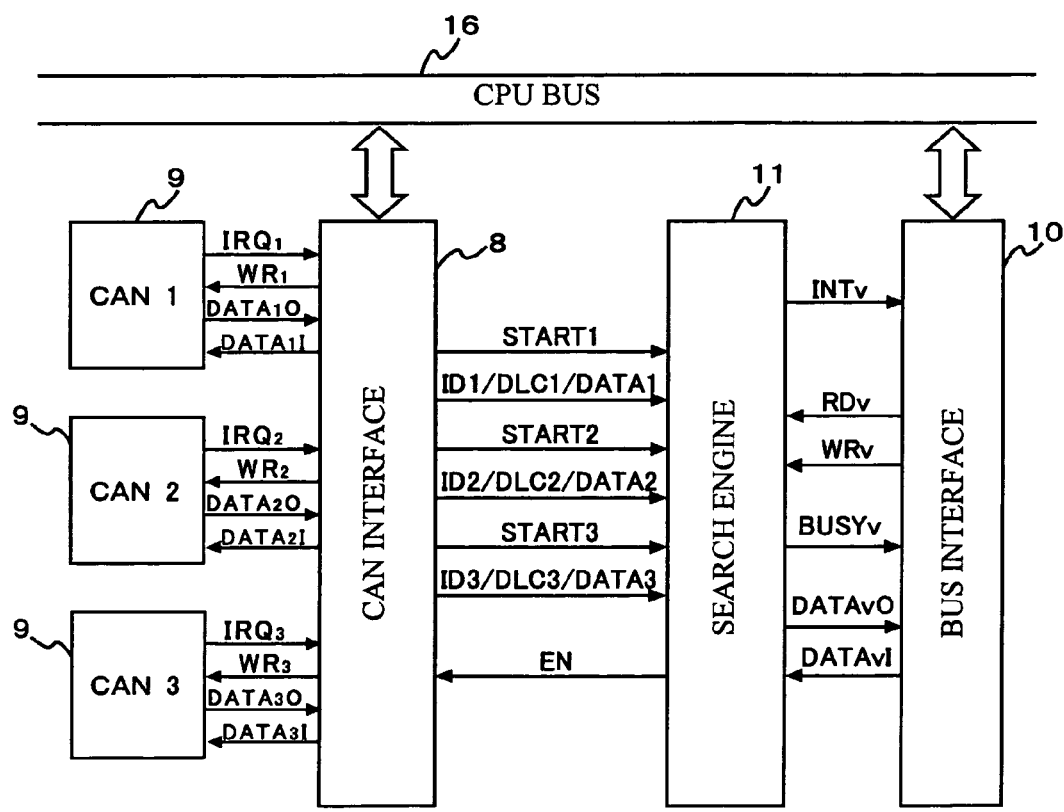
FIG. 14 shows signals input/output in communication among CANs, a CAN interface, the search engine, and a bus interface in accordance with the first embodiment of the present invention.

FIG. 14 shows signals input/output in communication between the CANs 9, the CAN interface 8, the search engine 11, and the bus interface 10. $IRQ_1$ (interrupt signal from the CAN_1), $WR_1$ (register write signal), DATAxO (register read signal), DATAxI (register write signal) are output from the CAN 9 to the CAN interface 8. The similar signals are also output from the CAN_2 and the CAN_3. The CAN interface 8 outputs the STARTx (routing start signal), IDx, DLCx, DATAx, and EN (operation enable signal of the gateway controller 12) to the search engine 11.

When a given number of the frames are stored in the transmission FIFO memories 21, the search engine 11 outputs INTv (gateway interrupting signal) to the CPU 2. The CPU 2 outputs RDv (register reading signal) and WRv (register writing signal), and reads the count value of the message counter 22. Then, data writing or data reading is carried out with the use of DATAvO (register (that includes the transmission FIFO memory 21) reading data), DATA vI (register (that includes the transmission FIFO memory 21) writing data), or the like. BUSYv (transmission FIFO memory 21 writing operation signal) is output to the CPU 2.

Here, a description is given of the data label applied on the search engine 11. The data label carries no special significance in the hardware configuration of the gateway controller, and is not directly related to routing. However, the data label is added to the frame data and transferred, as shown in FIG. 9B. The data label is represented with eight bits. The data label is applied to the frame data at the time of routing process, and is forwarded to the transmission FIFO memory 21. The data label is acquired by means of the software process of the program control, and is used as a reference pointer for a frame information table stored in the ROM 3. This eliminates the necessity of searching the frame information by means of the software process again, thereby making it possible to shorten the time for a forwarding process by means of software.

In addition, it is desirable that the check value is registered for the SUM check in the routing map, as shown in FIG. 8. Calculated are the SUM values of the data such as CAN_ID, the mask information, the destination channel, the transmission FIFO memory number, and the data label stored in the entry. Such calculated SUM value is compared with the check value stored in the routing map. If the values are different, it is considered that there is a routing error and a SUM_ERR signal is then output to the CPU 2.

Second Embodiment

Figure 15:
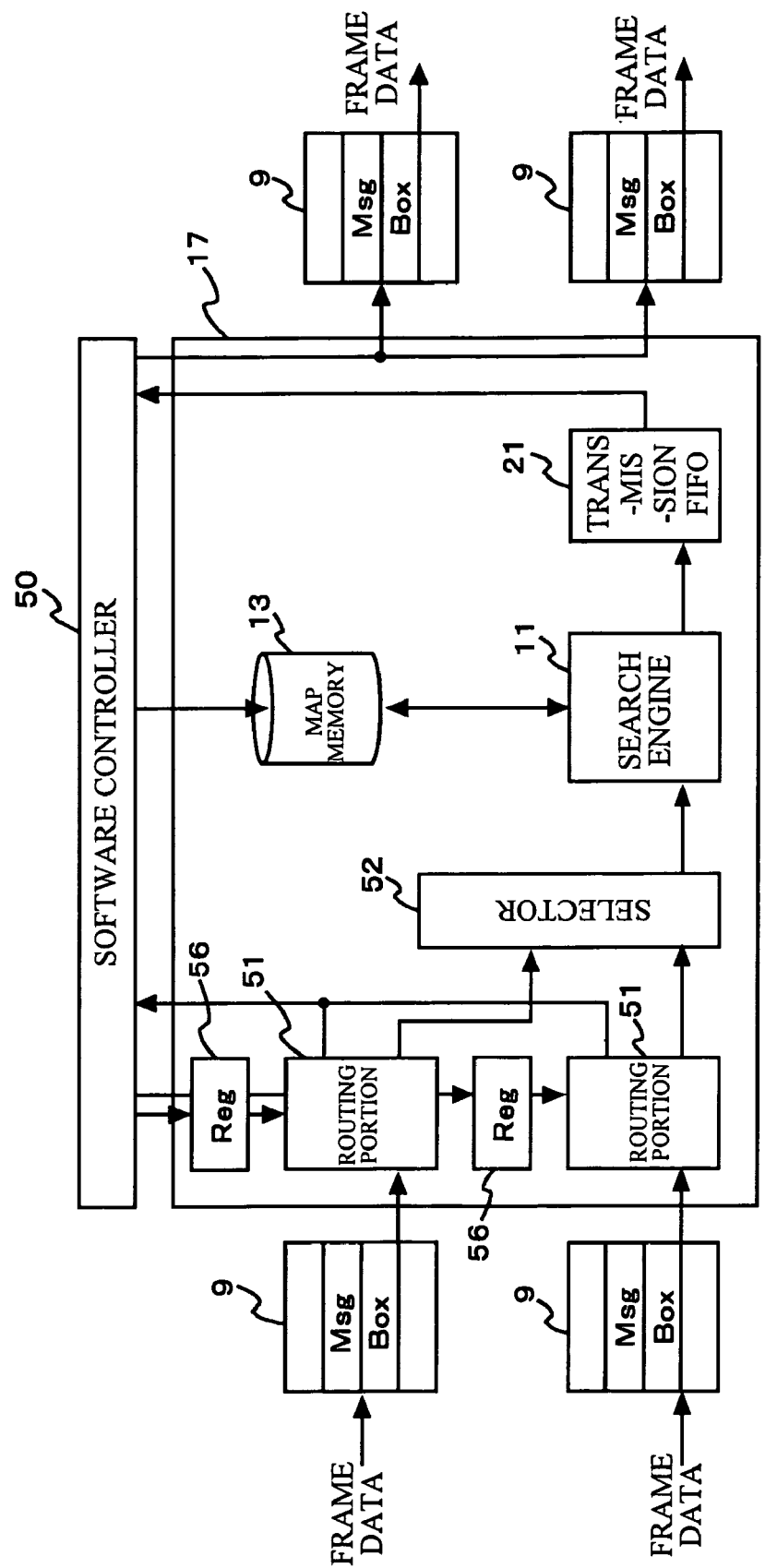
FIG. 15 shows a configuration of a gateway hardware macro portion in accordance with a second embodiment of the present invention.

A second embodiment of the present invention will be described with reference to the accompanying drawings. FIG. 15 shows a configuration of the gateway hardware macro portion 17. In accordance with the present embodiment, a routing portion 51, a selector 52, a register 56 are provided in former stages of the above-described search engine 11 and the transmission FIFO memories 21, as shown in FIG. 15.

The routing portion 51 is provided for each communication channel as shown in FIG. 15, in such a manner that the frame data is obtained from the message box of the CAN 9 to implement a routing process on the frame data according to the forwarding destination thereof. The routing portion 51 refers to the destination information set on the frame data, and sets a forwarding destination of the frame data to any of a software controller 50, the selector 52, and both the software controller 50 and the selector 52. The software controller 50 is a functional component that is realized when the CPU 2 operates by means of the program control. In this manner, the forwarding destination is routed by a channel unit or by a frame unit that has been selected, thereby reducing the load processed by the search engine 11. In addition, the frame data to be transmitted to the software controller 50 can be forwarded by priority without using the search engine 11, thereby making the process start time earlier on the software controller 50. Furthermore, it is possible to implement the software process by the software controller 50 and the hardware process by the search engine 11 in parallel.

The register 56 stores the setting information set by the software controller 50. The setting information includes at least operation setting information of the gateway apparatus and the setting information on routing. The routing portion 51 carries out the routing operation of the frame data in accordance with the setting information stored in the register 56. Only the routing portion 51 operates with reference to the setting information. The selector 52, the search engine 11, the transmission FIFO memories 21 arranged in the latter stage do not stop operating according to the setting information. For this reason, even if the gateway setting or the communication channel is dynamically changed, there is no problem that the frame data is lost in the gateway hardware macro portion 17.

In the first embodiment described above, the search engine 11 and the transmission FIFO memories 21 are provided for each communication channel. However, in accordance with the present embodiment, one search engine 11 and one set of the transmission FIFO memories 21 are provided for multiple communication channels. Alternatively, one search engine 11 and one set of the transmission FIFO memories 21 may be provided for a given number of the communication channels, not shown. To realize the above-mentioned configuration, the selector 52 is provided in the former stage of the search engine 11. The selector 52 controls the timing when the data output from multiple communication channels is simultaneously input into the search engine 11. Even if multiple pieces of frame data are output from multiple communication channels simultaneously, the selector 52 controls the timing when the frame data is output to the search engine 11 according to the order of priority or an arrival sequence. Thus, the search engine 11 and the transmission FIFO memories 21 can be shared by the multiple communication channels.

Figure 16:
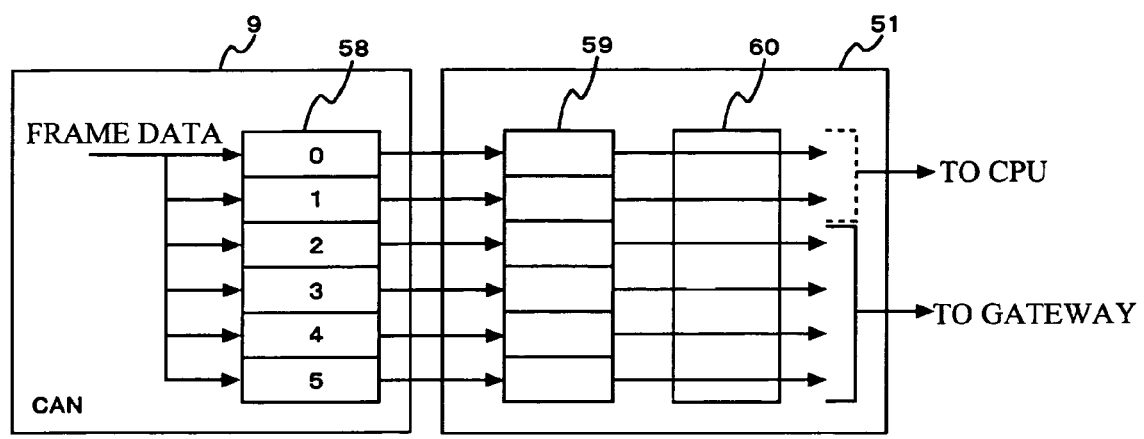
FIG. 16 is a block diagram showing a configuration of a routing portion in accordance with the second embodiment of the present invention.

Referring now to FIG. 16, a configuration of the routing portion 51 is described in detail. The routing portion 51 includes a first destination routing portion 59 and a second destination routing portion 60. The frame data is routed by a message routing portion 58 of the CAN 9 according to the data ID, and is registered in the message boxes (0, 1, 2, 3, . . . ). The first destination routing portion 59 sets the destinations of multiple pieces of frame data in the message boxes (0, 1, 2, 3, . . . ) that are routed by the message routing portion 58, to the software controller 50 or the search engine 11, or sets a multi-address transmission to send to both the software controller 50 and the search engine 11. There is the frame data that is discarded at this time. The second destination routing portion 60 forces the frame data that is scheduled to send to the search engine 11 to change to send to the software controller 50, or to discard the frame data in accordance with the processing status of the search engine 11.

Next, the search engine 11 is described in detail with reference to FIG. 17. The search engine 11 includes a state controller 70, an entry recognizing portion 71, a number adder 72, a number subtracter 73, a lower limit selector 74, an upper limit selector 75, an adder 76, a division and result holder 77, a table 78 in a memory, a match comparator 79, and an entry check portion 80.

Figure 17:
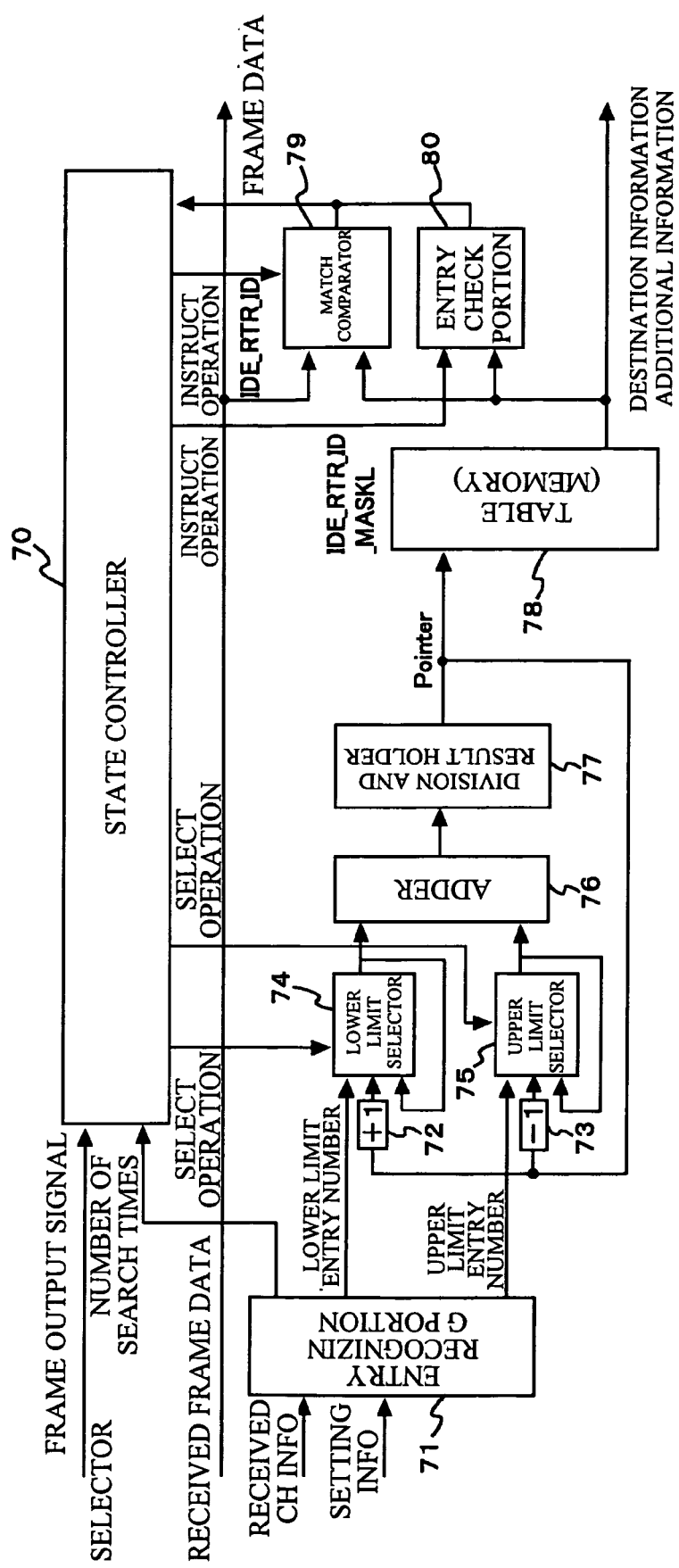
FIG. 17 is a block diagram showing a configuration of the search engine in accordance with the second embodiment of the present invention.

A frame output signal of the selector 52 is input into the state controller 70 to control the functional components shown in FIG. 17. The state controller 70 controls to implement the search of the table 78 a set number of times only, according to the number of search times input from the entry recognizing portion 71.

Figure 18A:
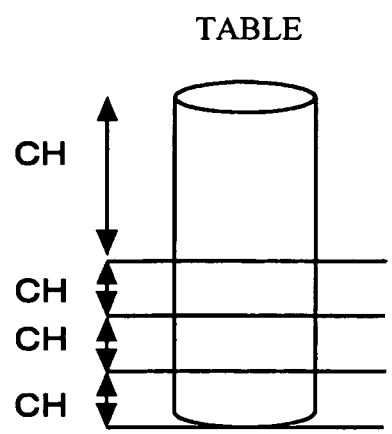
FIG. 18A through FIG. 18C show use areas in a memory on each channel in accordance with the second embodiment of the present invention.
Figure 18B:
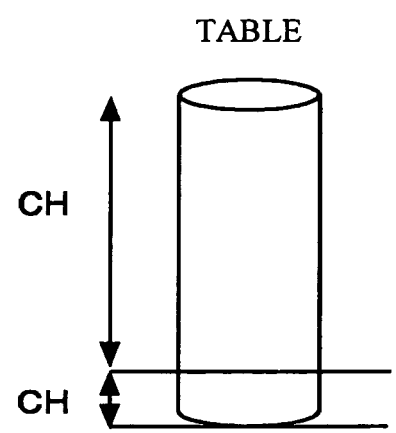
Figure 18C:
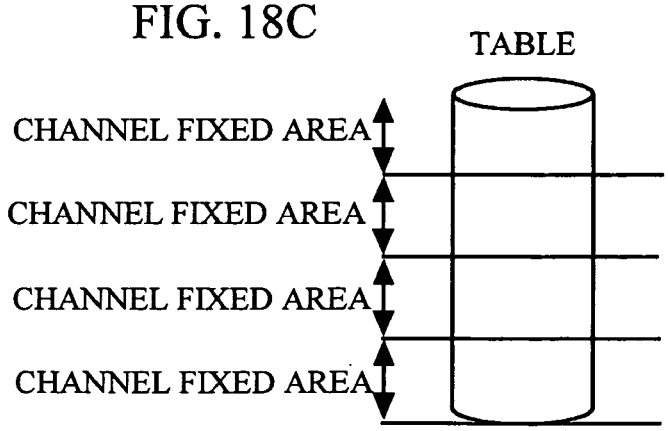

In accordance with the present embodiment, the number of the nodes registered for each of the communication channels is different, in other words, the number of the entries is different. Therefore, as shown in FIG. 18A and FIG. 18B, each of the communication channels has a different size of the area to be used in the memory (table) 78 that stores the entry data. The entry data registers the information on the forwarding destination of the frame data that has been transferred from each channel. For this reason, an upper limit entry number, a lower limit entry number, and the number of search times are set for each of the receiving channel by the entry recognizing portion 71.

Figure 19:
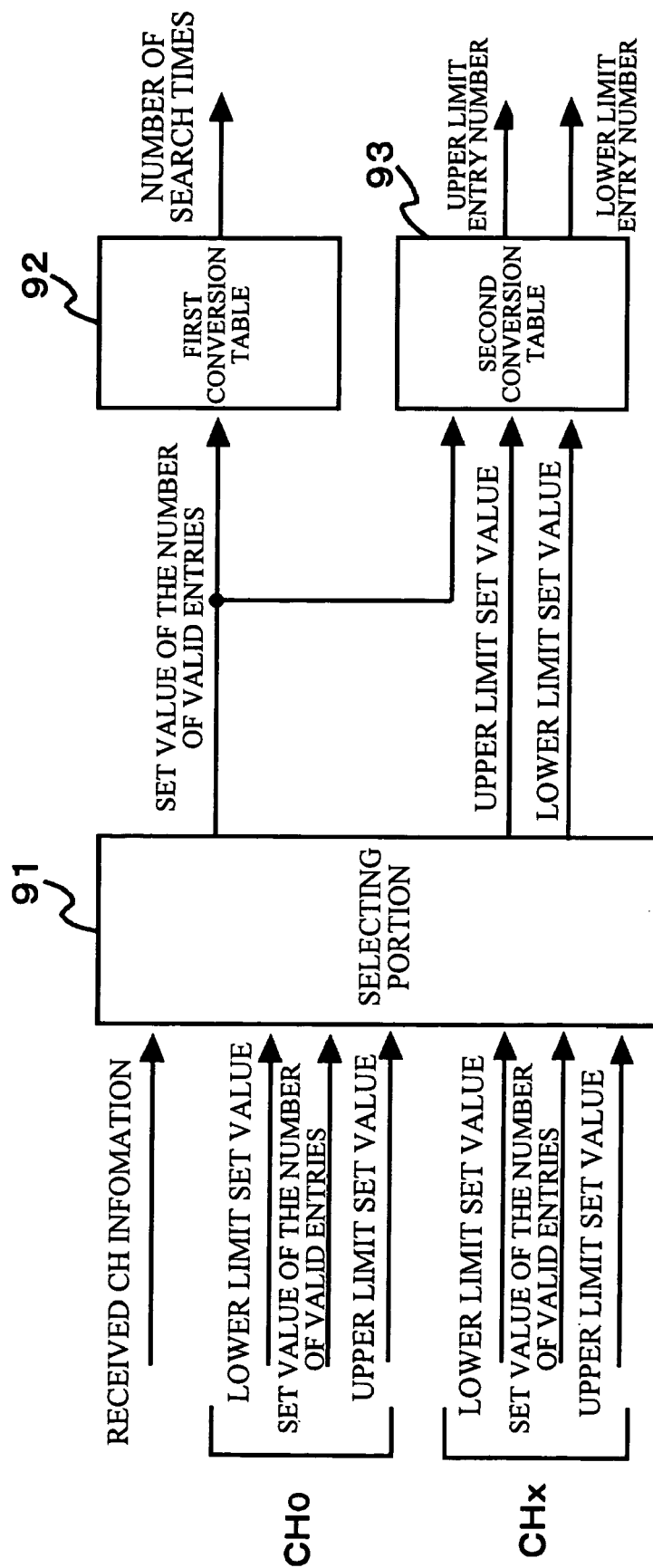
FIG. 19 shows a configuration of an entry recognizing portion in accordance with the second embodiment of the present invention.

FIG. 19 shows a configuration of the entry recognizing portion 71. The entry recognizing portion 71 includes a selecting portion 91, a first conversion table 92, and a second conversion table 93. Information on the channel that has received the data (hereinafter, referred to as received CH information) and the setting information for each channel are input into the selecting portion 91. The setting information includes a lower limit set value, an upper limit set value, and a set value of the number of valid entries. The lower limit set value denotes a lower limit value of the memory address assigned to the channel. The upper limit set value denotes an upper limit value of the memory address assigned to the channel. The set value of the number of valid entries denotes the number of the entries that have been registered for routing on the channel.

The selecting portion 91 specifies the communication channel that has received the frame data with the use of the received CH information, outputs the set value of the number of valid entries of the channel to the first conversion table 92, and outputs the upper limit set value and the lower limit set value to the second conversion table 93.

The first conversion table 92 calculates the number of search times that is set for the number of search times of the memory 78 with the set value of the number of valid entries. For example, if the number of entries of the channel is 256 entries (nodes), 256 equals two to the eighth power and the number of search times is therefore nine, after adding one to eight.

The upper limit set value and the lower limit set value are input into the second conversion table 93, and an upper limit entry number and a lower limit entry number are output. The lower limit entry number is the smallest number among the IDs of the nodes registered on the channel. Similarly, the upper limit entry number is the largest number among the IDs of the nodes registered on the channel. The lower limit entry number is output to the lower limit selector 74, and the upper limit entry number is output to the upper limit selector 75. The number of search times is output to the state controller 70.

The lower limit entry number is input into the lower limit selector 74 from the entry recognizing portion 71. The lower limit selector 74 selectively outputs any one of the entry numbers where one has been respectively added to the lower limit entry number, the entry number of the last time, and the output from the division and result holder 77, according to the control of the state controller 70. Similarly, the upper limit entry number is input into the upper limit selector 75 from the entry recognizing portion 71. The upper limit selector 75 selectively outputs any one of the entry numbers where one has been respectively subtracted from the lower limit entry number, the entry number of the last time, and the output from the division and result holder 77, according to the control of the state controller 70.

The adder 76 adds the entry number of the upper limit selector 74 and the entry number of the lower limit selector 75. The division and result holder 77 divides the added value of the adder 76 by two, and holds the division result.

Figure 20:
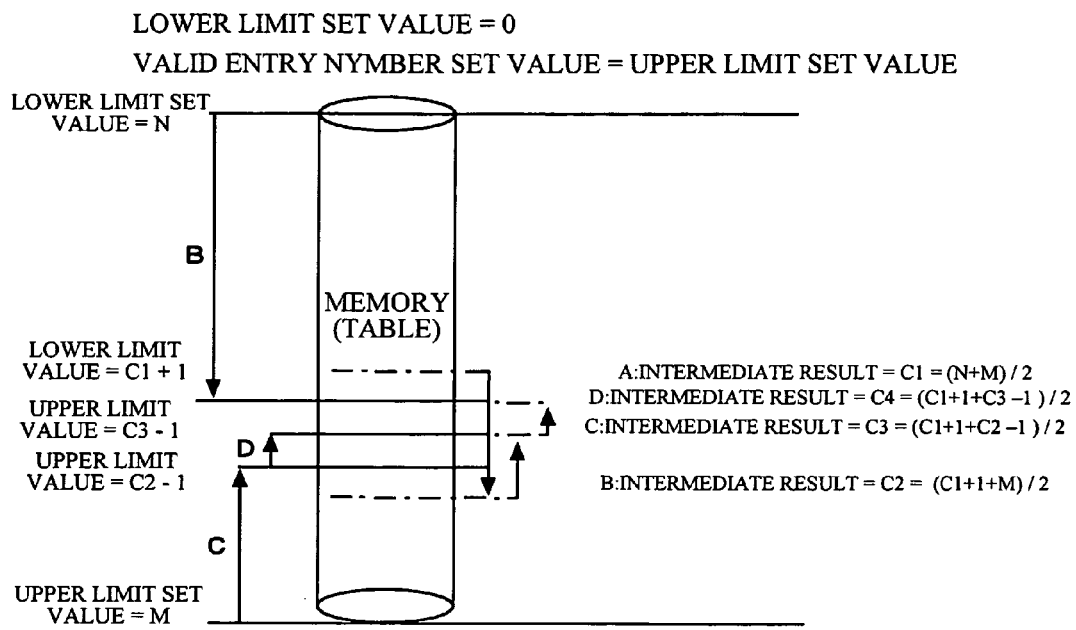
FIG. 20 schematically shows the method of the binary search in accordance with the second embodiment of the present invention.

Referring now to FIG. 20, a description is given of a search method in accordance with the present embodiment. In the present embodiment, the binary search is employed. FIG. 20 schematically shows the method of the binary search. N is a lower limit set value of the memory used by the channel of a search target, and M is an upper limit set value thereof. Here, the set value of the number of valid entries is set to the upper limit set value and zero is set to the lower limit set value, for ease of explanation. In the binary search, firstly, an intermediate value of the upper limit set value and the lower limit set value is calculated. In other words, $(N+M)/2$ is obtained as C1. The entry data of the address of C1 is compared with the ID of the received data. For example, if the ID of the received data is greater than the entry data, the entry data of the search target is considered to be included in a larger half of the memory address. Then, the lower limit selector 74 selects a value where one is added to the previous value of C1 retained on the division and result holder 77. The upper limit selector 75 still selects the previous value of M. The state controller 70 controls the above-mentioned operation. The values are added on the adder 76 and then are divided by two on the division and result holder 77. As a result, $(C1+1+M)/2$ is obtained as C2. Such calculated entry data and the received ID are compared, and the next address is sequentially generated. Finally, the entry data that matches the ID of the received data can be searched from the data in the memory 78.

Figure 21:
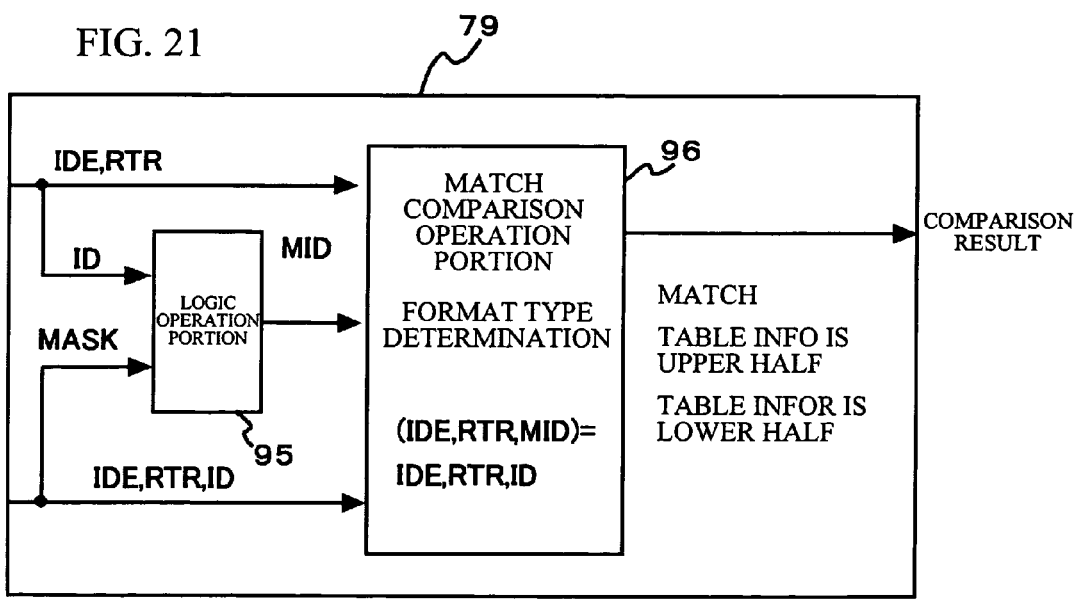
FIG. 21 shows a configuration of a match comparator in accordance with the second embodiment of the present invention.
Figure 22:
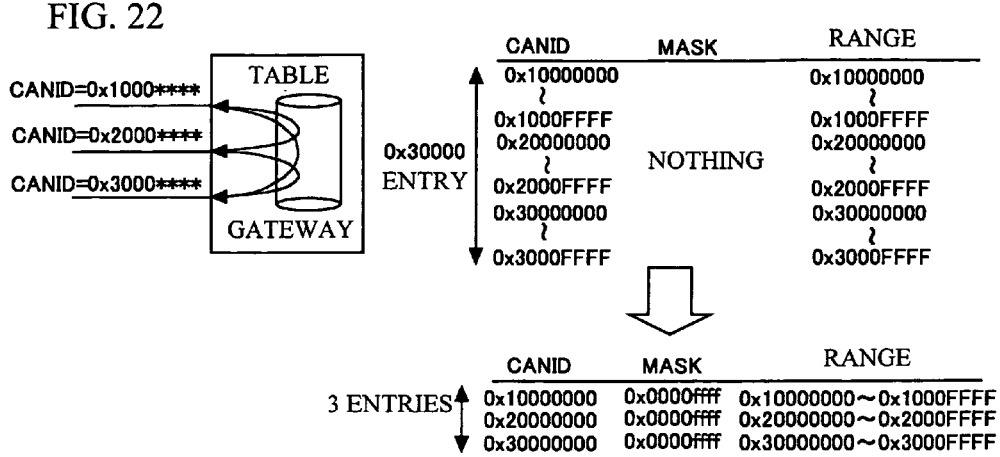
FIG. 22 shows a masking process in accordance with the second embodiment of the present invention.

The entry check portion 80 checks whether or not the entry data read out of the table 78 is normal. The check result is output to the state controller 70. The match comparator 79 compares the entry data read out of the table 78 and the ID of the received data. FIG. 21 shows a configuration of the match comparator 79. The match comparator 79 includes a logic operation portion 95 and a match comparison operation portion 96. The logic operation portion 95 masks the ID of the received data to limit the scope of search. The match comparator 79 compares the masked ID and the entry data that has been read to determine whether both are matched.

Figure 23A:
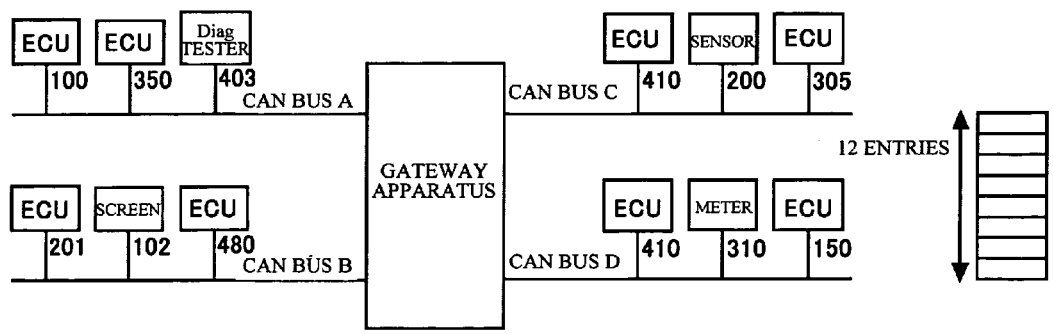
FIG. 23A and FIG. 23B show the masking process in accordance with the second embodiment of the present invention.
Figure 23B:
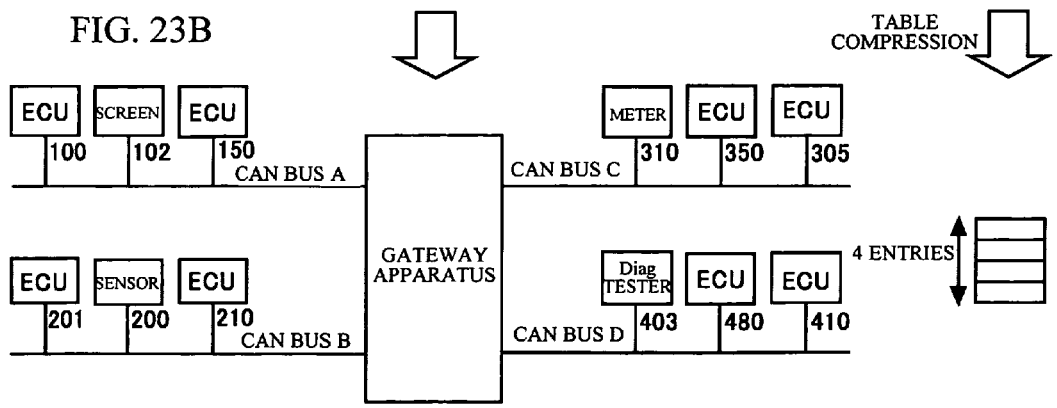

For example, as shown in FIG. 23A, if ID numbers are randomly applied to four CAN buses A, B, C, and D connected to the gateway apparatus, the matched ID has to be found by carrying out the comparison 12 times at maximum. However, as shown in FIG. 23B, if the nodes on an identical bus have several same higher-order bits, it is possible to find from what channel the data is output by carrying out the comparison four times.

Figure 26:
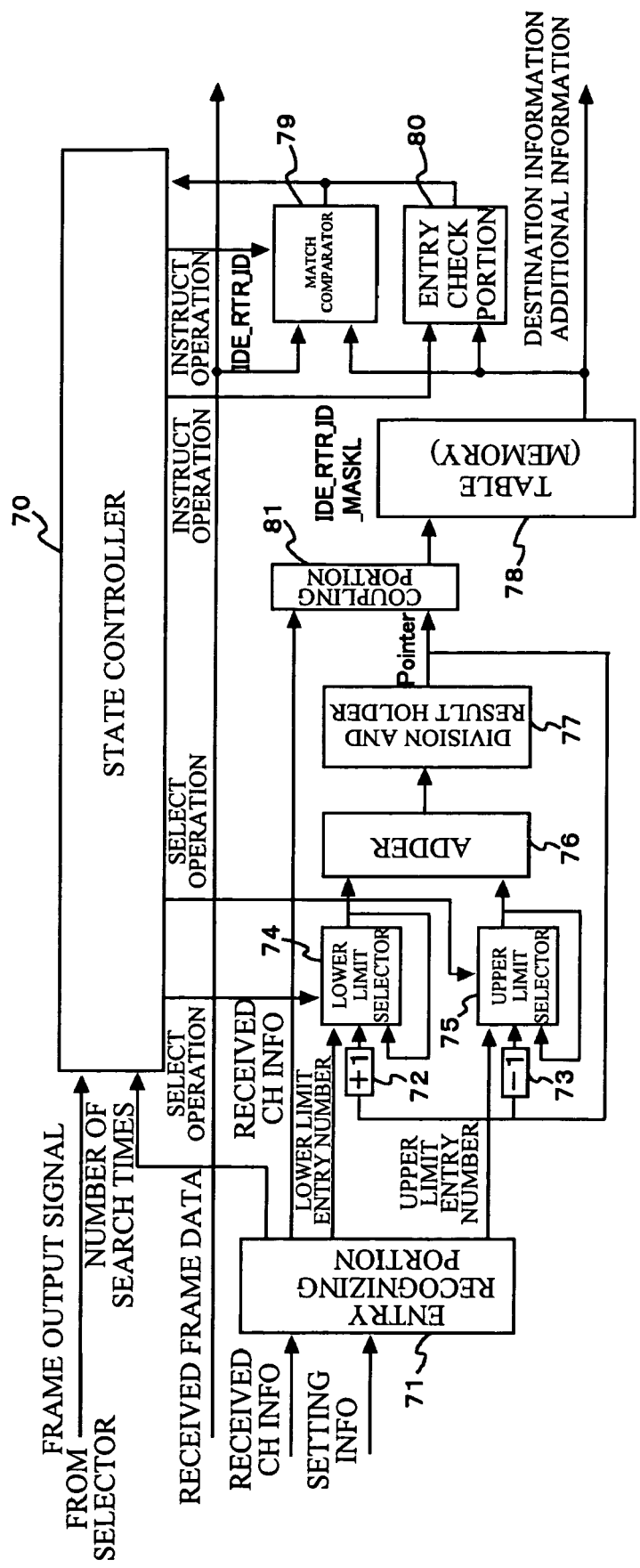
FIG. 26 shows another configuration of the search engine in accordance with the second embodiment of the present invention.

If a fixed width of the memory area is provided for each channel as shown in FIG. 18A, a coupling portion 81 is provided as shown in FIG. 26. Then, the address of the memory (table) 78 can be configured by setting the higher-order bits to represent the received channel number and setting the lower bits to represent the address of a pointer.

It is also possible to change the capabilities of the search engine 11 by changing the number of the entries according to the channel. That is to say, if 256 entries are available in a memory area, the binary search has to be carried out nine times. However, if 64 entries are available in the memory area, the search time can be reduced to seven times. The number of the entries available in the memory area can be changed according to the capabilities required for the search engine 11.

Figure 24:
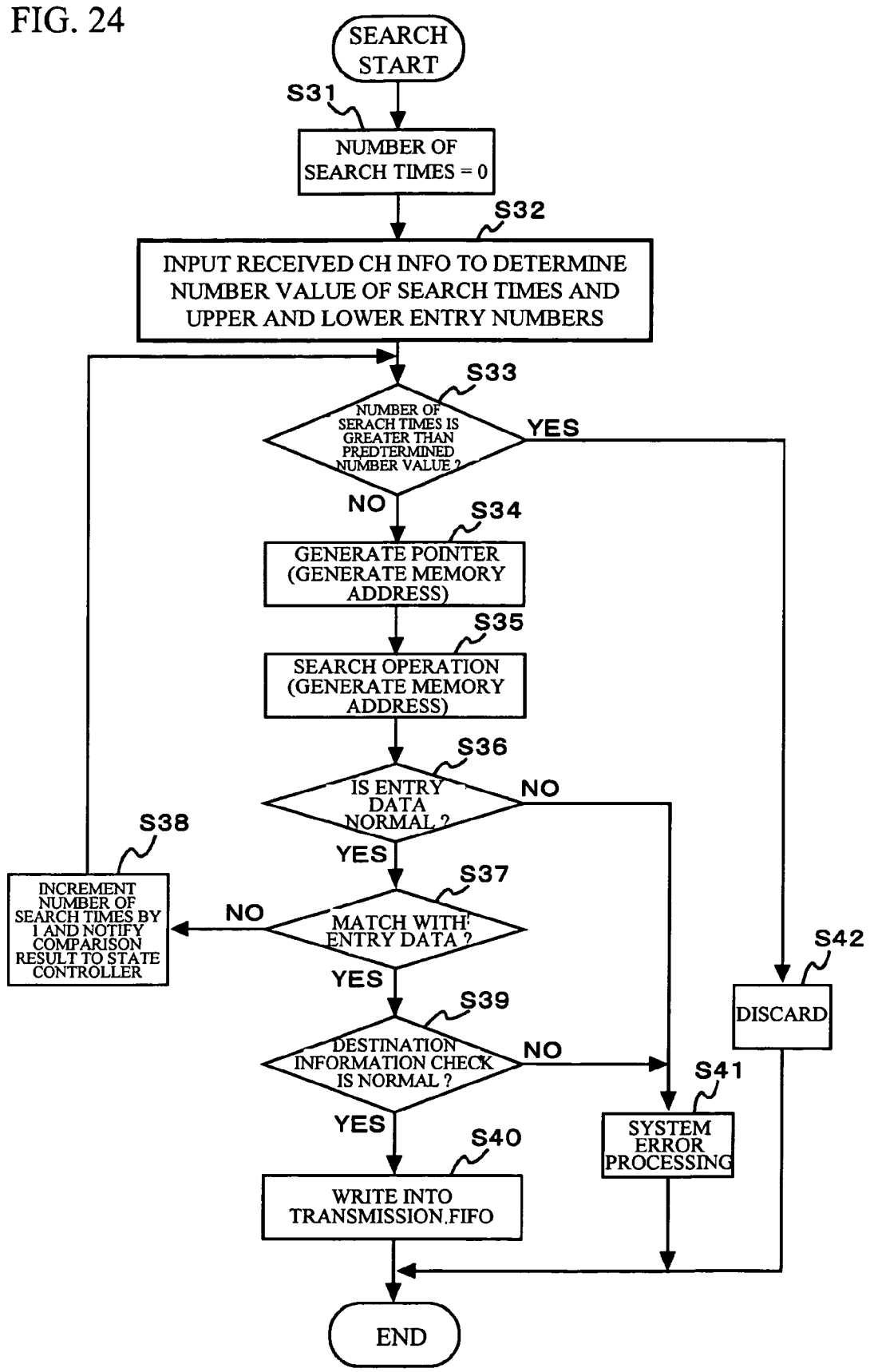
FIG. 24 is a flowchart showing a process procedure of the search engine in accordance with the second embodiment of the present invention.

Next, a description is given of a process procedure of the search engine 11, with reference to a flowchart shown in FIG. 24. When the search starts, the state controller 70 firstly sets the number of search times to zero (at step S31). In synchronization with this process, the number of the entries of the channel is obtained from the received CH information on the entry recognizing portion 71, and a number value of search times is predetermined and set according to the number of the entries (at step S32). Such predetermined number value of search times is notified to the state controller 70 from the entry recognizing portion 71.

Subsequently, the state controller 70 compares the number of search times and the predetermined number value of search times notified by the entry recognizing portion 71 (at step S33). If the number of search times is smaller than the predetermined number value of search times (YES at step S33), a pointer address of the memory is created on the basis of an initial value or information of a number magnitude comparison of the previous time (at step S34). The lower limit entry number is input into the lower limit selector 74 from the entry recognizing portion 71. Similarly, the upper limit entry number is input into the upper limit selector 75 from the entry recognizing portion 71. The adder 76 adds the lower limit entry number and the upper limit entry number. The division and result holder 77 divides such added value by two and holds the result. This result serves as the pointer address.

When the pointer address is generated, the entry data indicated by the pointer address is read out of the memory 78 (at step S35). Then, such read entry data is input into the entry check portion 80, and is checked whether or not the data is normal. If the data is not normal (NO at step S36), it is processed as a system error (at step S41). If the data is normal (YES at step S36), the match comparator 79 determines whether or not the ID of the received data matches the entry data. If both are not matched (NO at step S37), the number of search times is incremented by one, the number magnitude comparison on the match comparator 79 is output to the state controller 70 (at step S38), and repeats the process from step S33. The state controller 70 controls the lower limit selector 74 and the upper limit selector 73, according to the magnitude comparison result, and the pointer address is generated according to the comparison result of the previous time. If both are matched (YES at step S37), the destination information of such matched entry data is checked (at step S39). If the destination information is normal, the destination information of the entry data is written into the transmission FIFO memory 21 (at step S40). If the destination information is not normal (NO at step S39), it is processed as a system error (at step S41). If the number of search times is greater than the predetermined number value of search times (YES at step S33), such received frame data is discarded (at step S42).

Figure 25:
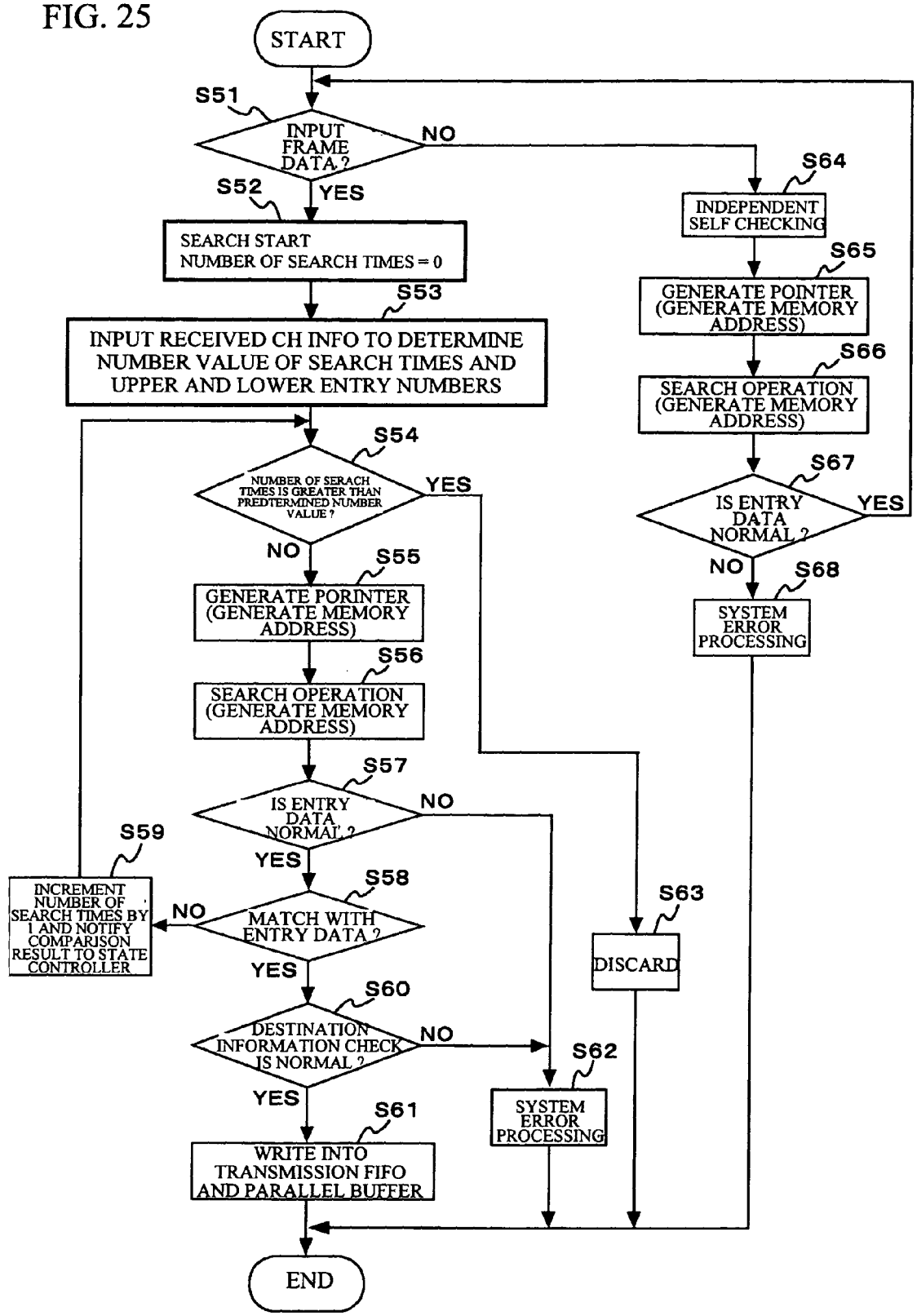
FIG. 25 is a flowchart showing a process procedure of the search engine, in particular, a procedure for an independent self checking in accordance with the second embodiment of the present invention.

The state controller 70 carries out a normality check operation of the map information, while the frame data is not being received in an idle period. Referring to a flowchart in FIG. 25, the normality check operation is described. The state controller 70 implements an independent self checking (at step S64), while the frame data is not being received in an idle period (at step S51). The state controller 70 creates the pointer address (at step S66), and searches and acquires the entry data stored in the corresponding address (at step S66). Then, it is determined whether or not such acquired entry data is normal (at step S67). If it is determined that such acquired entry data is normal (YES at step S67), the process is completed. If an error is detected (NO at step S67), a system error is processed (at step S68).

Third Embodiment

A third embodiment of the present invention will be described with reference to the accompanying drawings.

Figure 27:
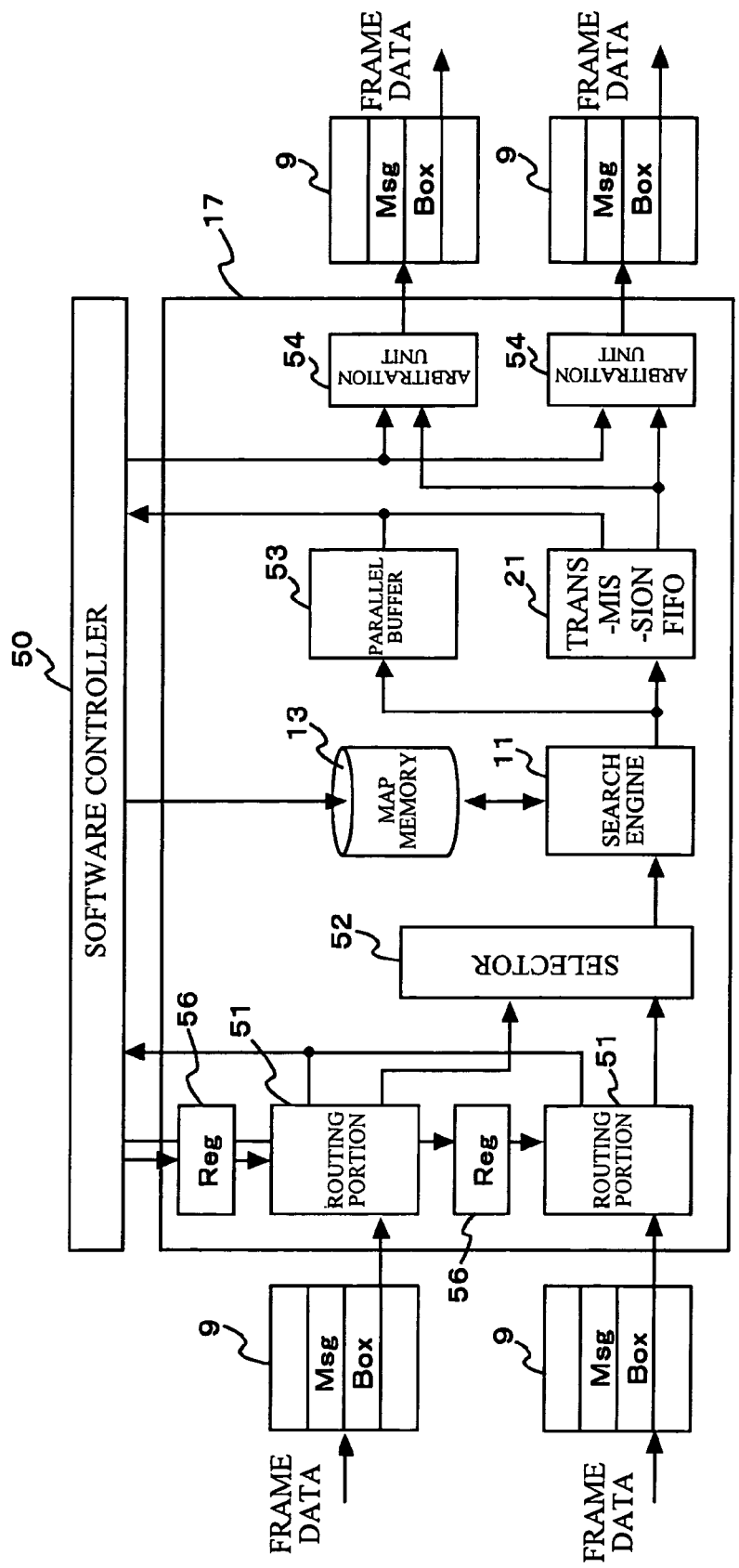
FIG. 27 shows a configuration of the gateway hardware macro portion used in accordance with a third embodiment of the present invention.

In the present embodiment, referring to FIG. 27, a parallel buffer (second storage portion) 53 is additionally provided, so the frame data output from the search engine 11 is stored in the transmission FIFO memory 21 and the frame data is also transferred to store in the parallel buffer 53. The data stored in the parallel buffer 53 is read by the software controller 50.

In the embodiments described above, it is configured in such a manner that the frame data is stored in the transmission FIFO memory 21 and then the software controller 50 reads the frame data out of the transmission FIFO memory 21. However, if there is a great processing load in another piece of frame data stored in the transmission FIFO memory 21 when the frame data having a high priority is transferred to the software controller 50, there is a waiting time on the software controller 50. Therefore, in accordance with the present embodiment, the frame data having a high priority is also stored in the parallel buffer 53 and the software controller 50 retrieves the frame data from the parallel buffer 53. This eliminates the waiting time. The parallel buffer 53 can not only store the frame data having a high priority but also store all the data. The parallel buffer 53 is capable of virtually mapping the result of the frame specification (determination) on a storage location (entry). This can reduce the load of the determination process implemented on the CPU 2.

In addition, an arbitration unit (second arbitration unit) 54 is provided in the latter stage of the transmission FIFO memories 21. One arbitration unit 54 is provided for each communication channel. The arbitration unit 54 has functionalities of adjusting the timing of writing into the message box of the CAN 9, when the frame data output from the transmission FIFO memory 21 overlaps the frame data output from the software controller 50. With the above-mentioned arbitration unit 54, the frame data can be transmitted by the gateway hardware macro portion 17 only without using the software controller 50.

Figure 28:
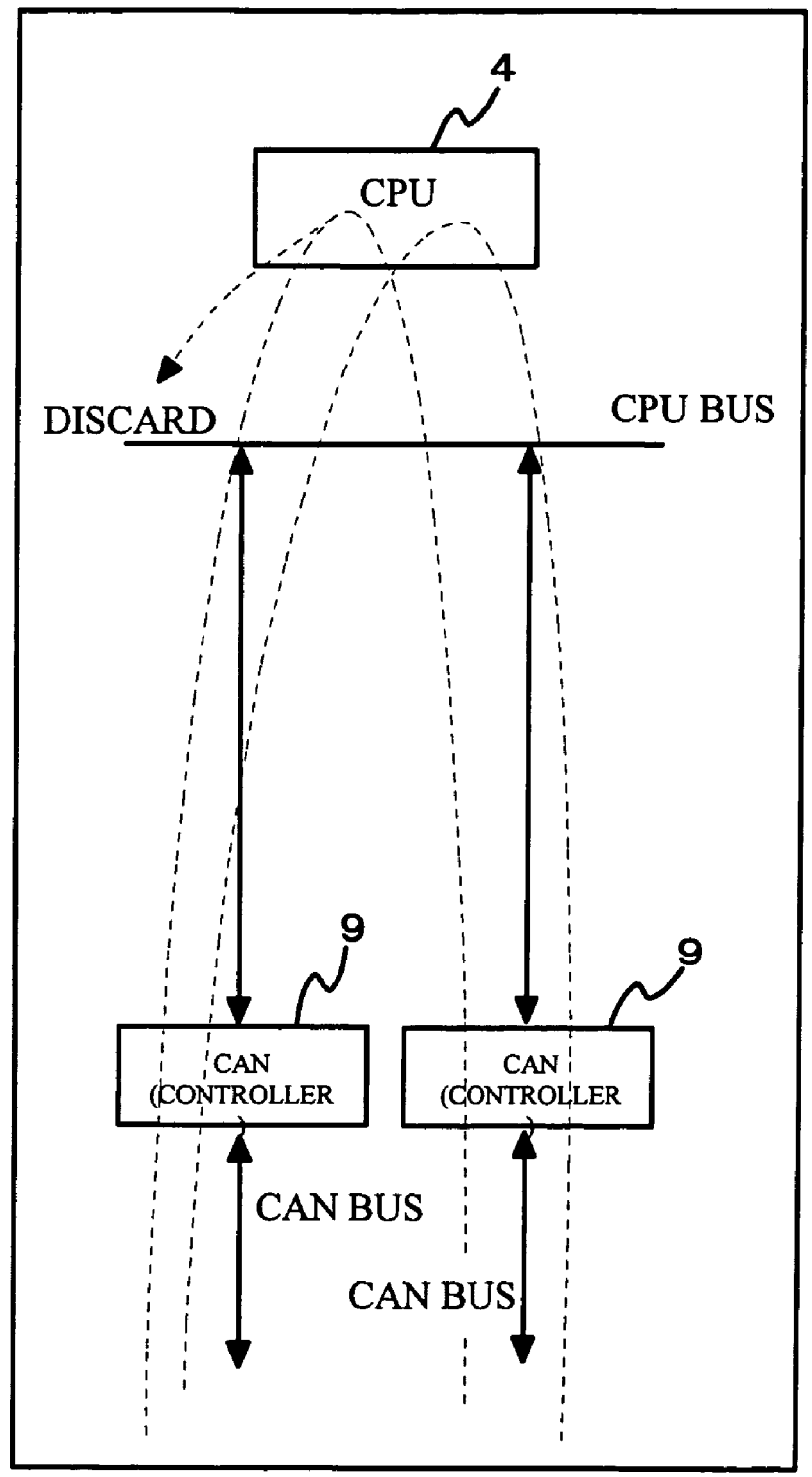
FIG. 28 shows a flow of the frame data when the frame data is forwarded only by the software control of the CPU.
Figure 29:
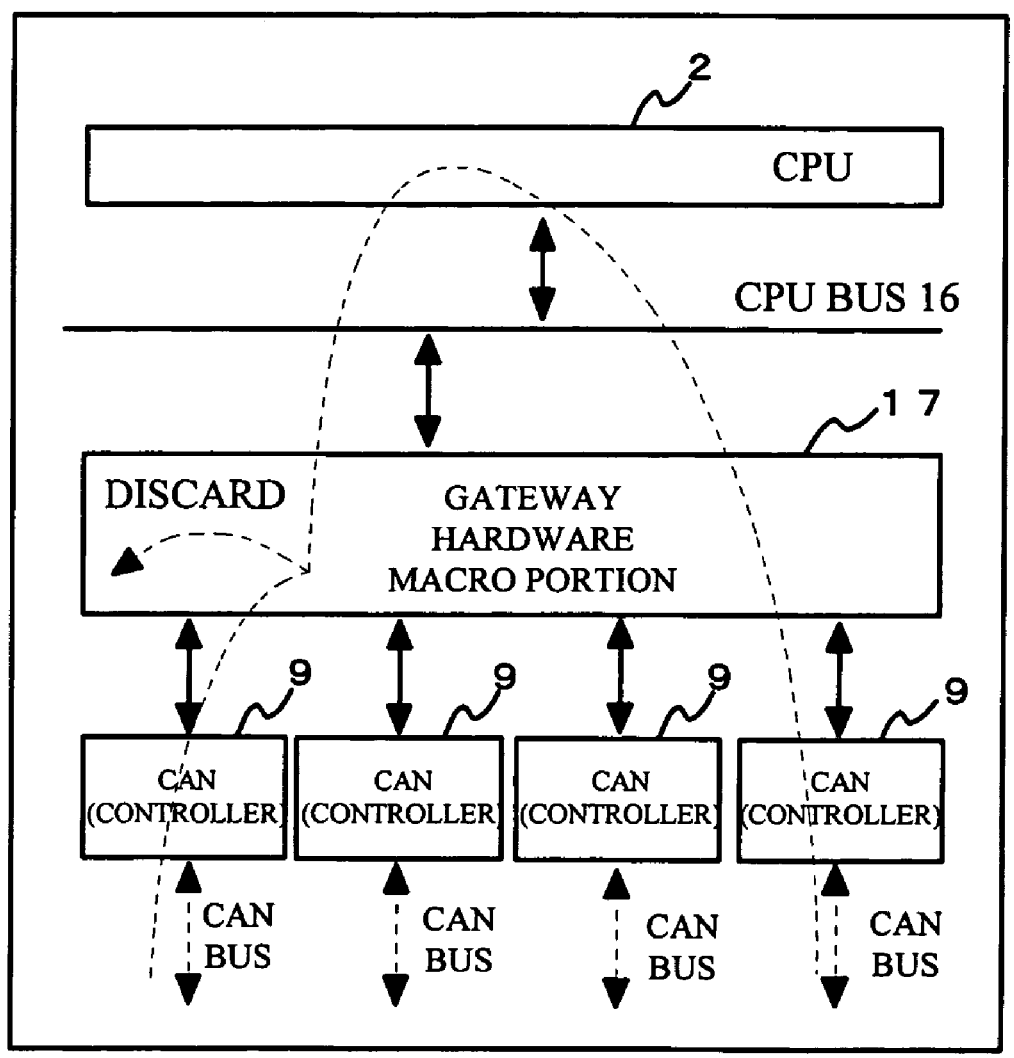
FIG. 29 shows a data flow of the frame data in accordance with the first embodiment of the present invention.
Figure 30:
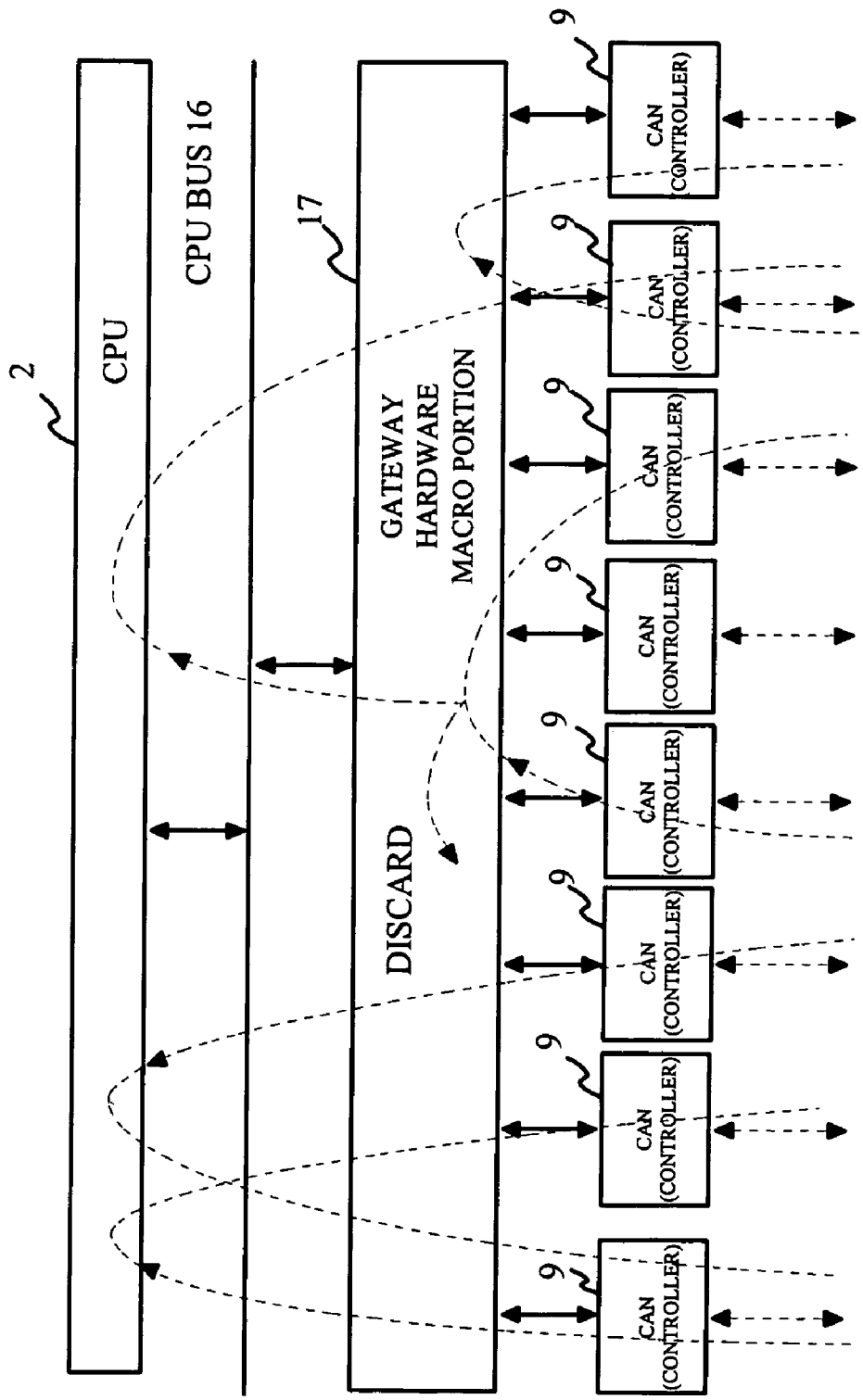
FIG. 30 shows a data flow of the frame data in accordance with the third embodiment of the present invention.

FIG. 28 shows a flow of the frame data when the frame data is forwarded only by the software control of the CPU 2. In the routing process by means of software only, there is a delay in the relay process, when the CPU share ratio of the application other than routing becomes higher. FIG. 29 shows a data flow of the frame data in accordance with the first embodiment of the present invention. In the in-vehicle gateway apparatus shown in FIG. 29, the frame data is routed on the hardware. However, the software control is needed for transmitting such routed frame data. In accordance with the present embodiment, however, as shown in FIG. 30, the frame data can be routed and forwarded by the gateway hardware macro portion 17 only. Furthermore, according to the need, the frame data stored in the gateway hardware macro portion 17 is passed on to the CPU 2.

Figure 31:
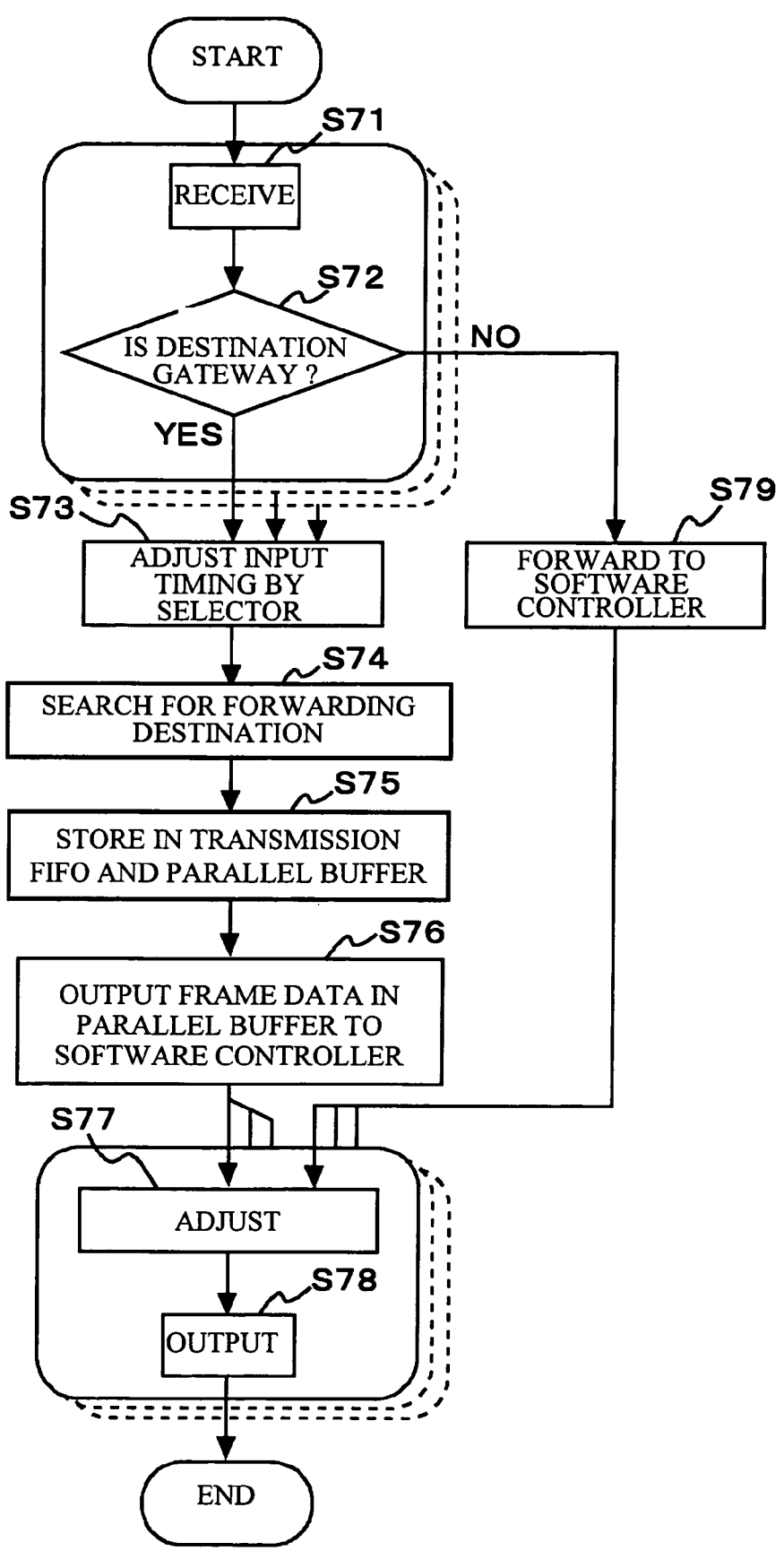
FIG. 31 is a flowchart showing a process procedure in accordance with the third embodiment of the present invention.

Referring to a flowchart of FIG. 31, an operation procedure employed in the present embodiment is described. Upon receiving the frame data (YES at step S71), the gateway hardware macro portion 17 routes the frame data on the routing portion 51 (at step S72). As described, the routing portion 51 determines the destination with the use of the ID set at the frame data, and sets whether the frame data should be output to the software controller 50 or to the search engine 11. The frame data is output to either or the software controller 50 or the search engine 11 or to both thereof, according to the setting.

When the selector 52 retrieves the frame data from the routing portion 51, the selector 52 outputs the data to the search engine 11 (at step S73). The search engine 11 searches for the forwarding destination of such retrieved frame data (at step S74), and stores the frame data in the transmission FIFO memory 21 and in the parallel buffer 53 (at step S75). The frame data stored in the parallel buffer 53 is read by the software controller 50 (at step S76). Then, the arbitration unit 54 arbitrates the frame data output from the software controller 50 and the frame data retrieved from the transmission FIFO memory 21 (at step S77) to write into the message box. The frame data written into the message box of the CAN 9 on each communication channel is read out to output to the bus of each channel (at step S78).

Figure 32:
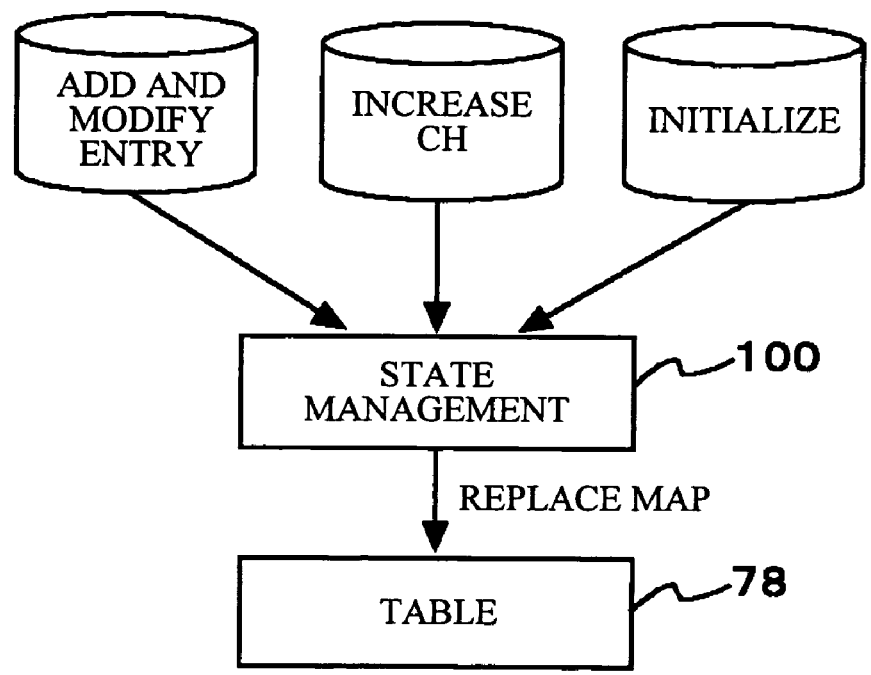
FIG. 32 shows a state management portion in accordance with the third embodiment of the present invention.

The map information used on the search engine 11 can be statically or dynamically changed according to the state of the vehicle. In accordance with the present embodiment, as shown in FIG. 32, a state management portion 100 is provided for changing the map information to be read out of the map memory 13, according to the state of the vehicle. At the time of initialization such as engine start or the like, the state management portion 100 retrieves the map information at the initialization from the map memory 13. When the CPU 2 issues an add request to increase the number of the channels, the map information at the time of adding the number of the channels is loaded from the map memory 13. In addition, when the entry on each channel is added or modified, the map information at the time of entry addition and modification is loaded from the map memory 13. Such loaded map information is checked on the state management portion 100 whether or not it is normal, and is stored in the table (memory) 78 of the search engine 11.

Figure 33:
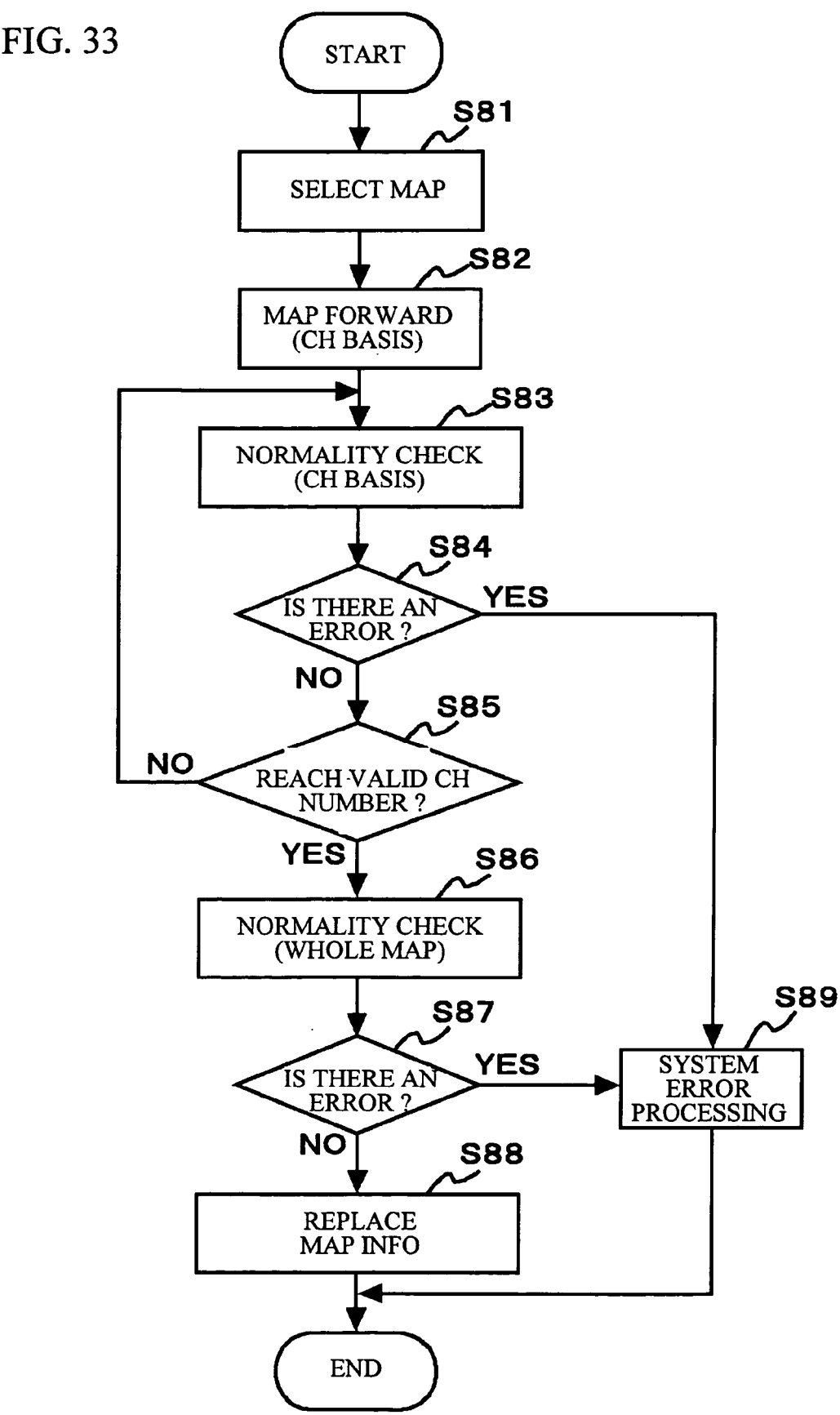
FIG. 33 is a flowchart showing a process procedure of the state management portion in accordance with the third embodiment of the present invention.

Referring to a flowchart shown in FIG. 33, a process procedure of the state management portion 100 is described. The state management portion 100 selects a map in accordance with the state of the vehicle (at step S81). Such selected map information is retrieved on a channel basis (at step S82), and checks the normality of the map information (at step S83). If there is an error in normality determination (YES at step S84), it is processed as a system error (at step S89). If the number of pieces of map information in which the normality has been checked reaches the number of the valid channels (YES at step S85), the normality is further checked on the whole map (at step S86). If there is also an error (YES at step S87), it is processed as a system error (at step S89). When the normality check is completed (NO at step S87), such selected map information is stored in the table 78 and the data is replaced (at step S88).

Figure 34:
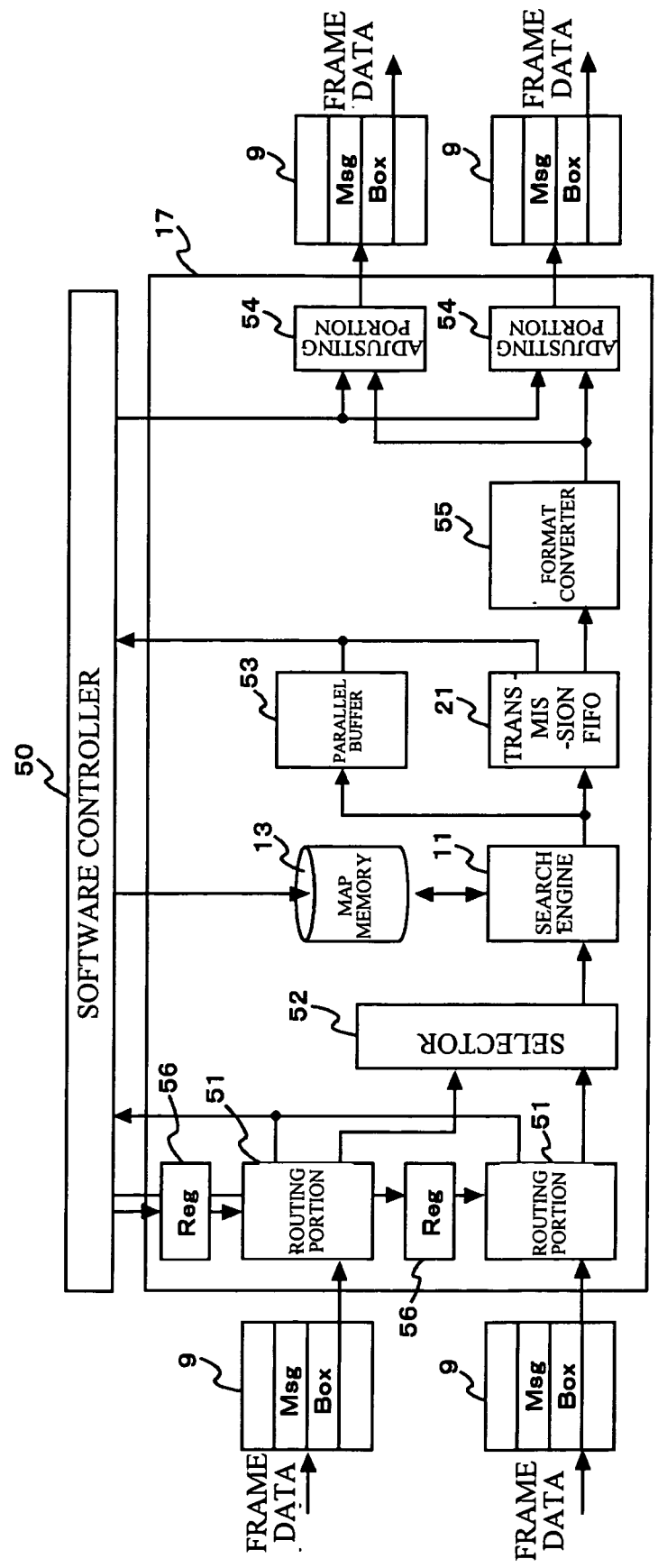
FIG. 34 shows another configuration of the gateway hardware macro portion used in accordance with the present invention.
Figure 35:
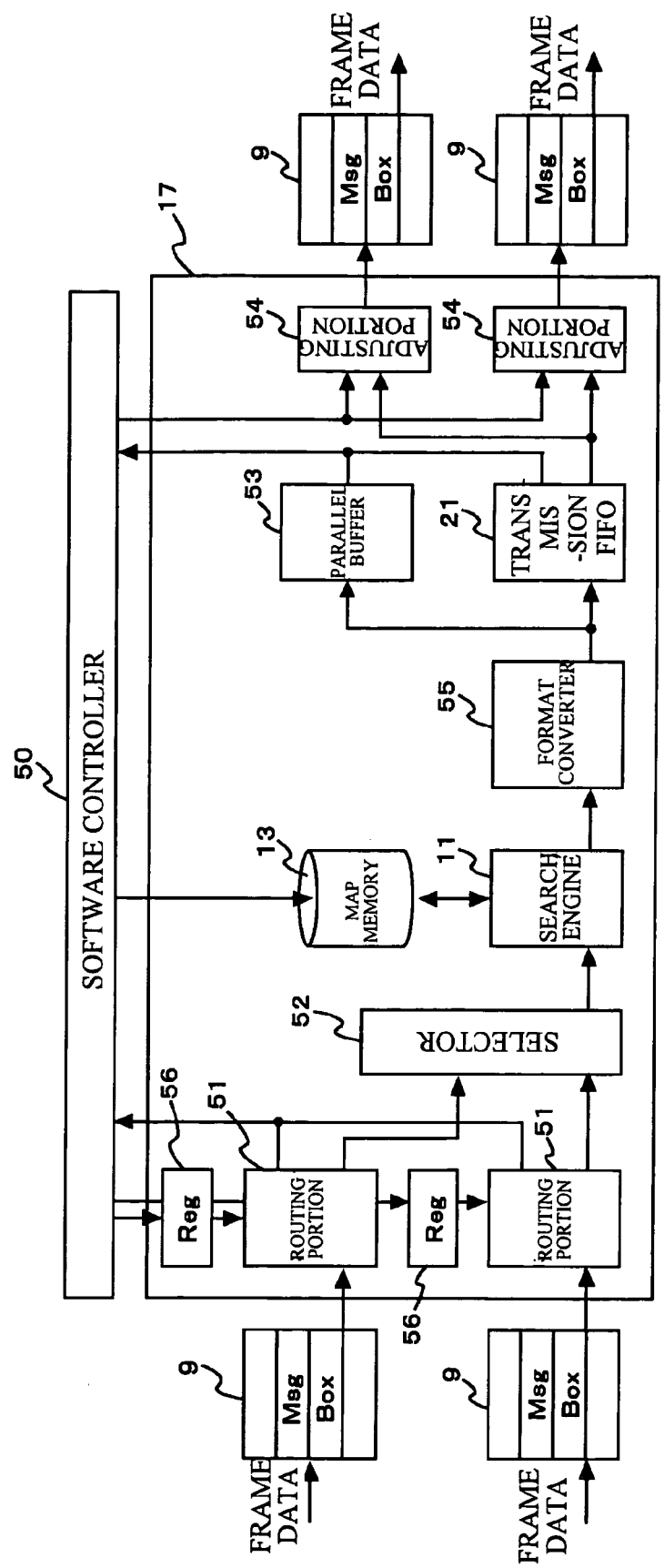
FIG. 35 shows yet another configuration of the gateway hardware macro portion used in accordance with the present invention.
Figure 36:
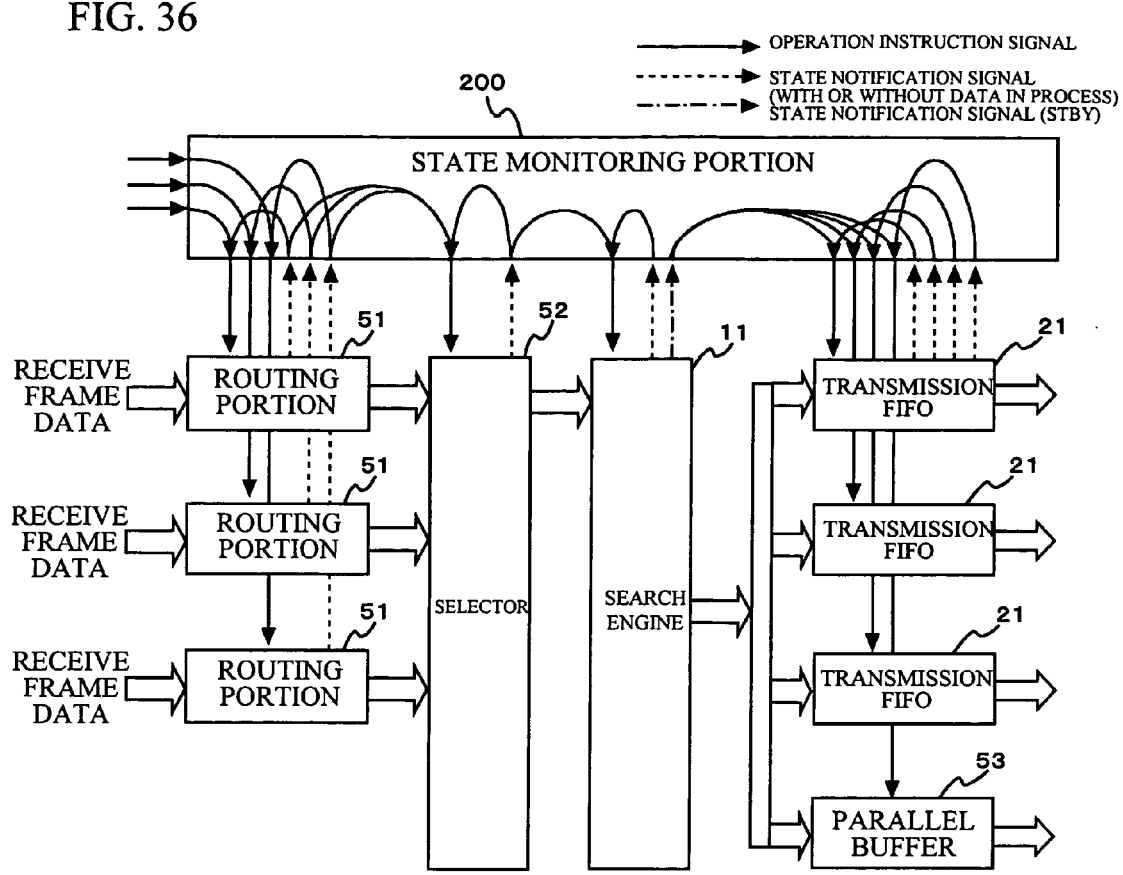
FIG. 36 shows still another configuration of the gateway hardware macro portion used in accordance with the present invention.

As an alternative configuration other than those employed in the above-described embodiments heretofore, for example, a format converter 55 may be provided as shown in FIG. 34 and FIG. 35. In a case where the protocol used on a destination node of the frame data is different from that used on a source node of the frame data, the format converter 55 converts the frame data to have a format that can be recognized on the destination node. As shown in FIG. 34, the format conversion may be performed for the frame data retrieved from the transmission FIFO memory 21. As shown in FIG. 35, the format conversion may be performed for the frame data before the frame data is stored in the transmission FIFO memory 21.

In addition, a state monitoring block 200 may be provided for monitoring whether or not there is a piece of the frame data in each block. The state monitoring block 200 may operate only the transmission FIFO memory 21 that includes the frame data to be processed. Alternatively, only a functional block that is supposed to receive the frame data may be operated. This makes it possible to reduce the power consumption on the gateway apparatus.

Figure 37:
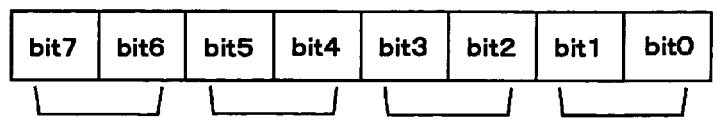
FIG. 37 shows an example of a data label in accordance with the present invention.
Figure 38:
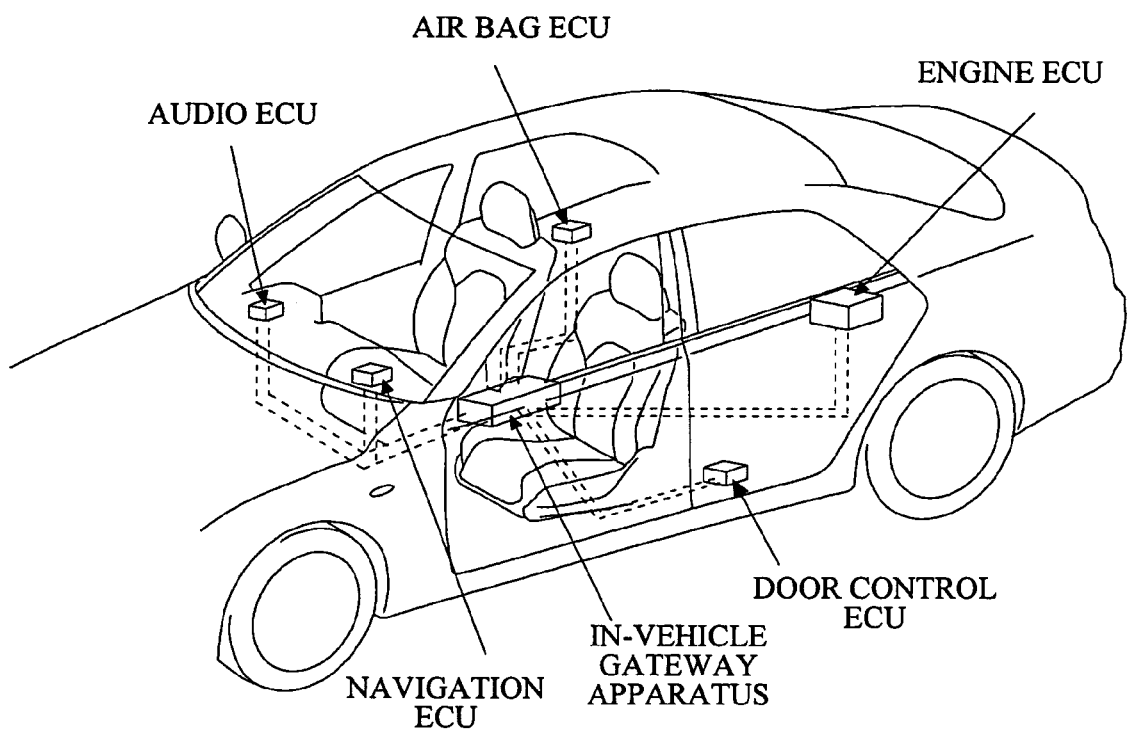
FIG. 38 is a view showing a connection state in which multiple ECUs and an in-vehicle gateway apparatus of the conventional art.

As usage of the data label applied to the frame data, in the first embodiment, the data label has been described as a reference pointer of the frame information table. In addition, there is a following usage. The data label having eight bits is divided into two bits respectively, as shown in FIG. 37. Four two bits respectively represent a thinning out pattern that represents a cyclic timing of thinned out transmission, an ID conversion that represents a pattern for ID conversion, a data label pattern that represents a pattern for data conversion, and a patter that represents a holding time. The afore-mentioned data labels are applied to the frame data so that the CPU 2 controls according to the data label so as to implement the data process, forwarding process, and fail safe process. Here, the data label is described to have eight bits. However, the number of bits to be applied to the frame data as a data label is not limited to eight bits.

Finally, the above-mentioned various aspects of the present invention are summarized as follows.

The present invention includes a gateway apparatus that controls a forwarding process of frame data between multiple communication channels, the gateway apparatus including: a search engine that is respectively provided for each of the multiple communication channels to route the frame data between the multiple communication channels; and a first storage portion that is respectively provided for each of the multiple communication channels to temporarily store the frame data routed.

In the above-mentioned gateway apparatus, the search engines may be implemented by hardware. The routing process by means of software creates a holding time in the routing process, when the application other than the routing process has a greater load. However, in accordance with the present invention, the routing process implemented by means of hardware does not create the holding time.

In the above-mentioned gateway apparatus, the search engine respectively provided for each of the multiple communication channels may be provided with a routing map used for a channel selection of the frame data. It is therefore possible for each search engine to implement the routing process independently.

In the above-mentioned gateway apparatus, the search engine may include an address generator that generates an address in the routing map; a routing map portion that obtains routing information of the address from the routing map; and a comparator that compares a first ID included in the routing information obtained from the routing map and a second ID included in the frame data, obtains a forwarding destination communication channel from the routing map when the first ID matches the second ID. It is possible to construct the search engine with a simple hardware apparatus.

In the above-mentioned gateway apparatus, the search engine may discard the frame data having a format that is not registered in the routing map. It is possible to prevent unnecessary frame data from forwarding.

In the above-mentioned gateway apparatus, the first storage portion may include multiple FIFO memories having multiple stages. The first storage portion may be provided with multiple FIFO memories, thereby enabling multiple pieces of frame data to store sequentially.

The above-mentioned gateway apparatus may include a controller that forwards the frame data routed and stored in the first storage portion to a forwarding destination communication channel. It is possible to transmit the frame data routed to a forwarding destination.

The above-mentioned gateway apparatus may include a DMA controller that forwards the frame data routed and stored in the first storage portion to a forwarding destination communication channel. It is possible to transmit the frame data that routed to a forwarding destination.

The above-mentioned gateway apparatus may include a counter portion that counts the number of pieces of frame data stored in the first storage portion. Accordingly, it is possible to count and display the number of pieces of frame data stored in the first storage portion. In addition, it is easy to learn the storage state of the first storage portion, for example, whether or not the first storage portion is full of the frame data. Furthermore, it is possible to secure the number of the frames that can be retrieved from the first storage portion.

In the above-mentioned gateway apparatus, the search engine may output an interrupt signal to a controller that controls the gateway apparatus, when the number of pieces of frame data counted by the counter portion reaches a given number. Notification is made that a given number of pieces of frame data is stored in the first storage portion, so that the next process such as a transmission process can be implemented.

The above-mentioned gateway apparatus may include a first arbitration unit that arbitrates the multiple communication channels, when the frame data routed by the search engine is stored in the first storage portion. The first arbitration unit arbitrates the frames output from the multiple search engines, thereby allowing the search engine to output the frame data without considering the output timing of the frame data routed.

In the above-mentioned gateway apparatus, the first arbitration unit may include a register in which a priority is set for each of the multiple communication channels; and the frame data is written into the first storage portion according to the priority, when multiple pieces of frame data are simultaneously written into the first storage portion. It is therefore possible to store the frame data of the communication channel in the first storage portion on a priority basis.

In the above-mentioned gateway apparatus, the search engine may apply an additional piece of data that represents a recorded position of the frame data necessary for forwarding the frame data. Accordingly, the controller is capable of retrieving the information necessary for transmission, with reference to the additional piece of data.

In the above-mentioned gateway apparatus, the search engine may output an interrupt signal to a controller that controls the gateway apparatus, when there is a routing error at the time of routing the frame data. It is possible to notify an error caused during routing to the controller.

In the above-mentioned gateway apparatus, the search engine implements an error check of the routing map, when the search engine determines that the frame data should be routed by searching the routing map. It is therefore possible to prevent the routing error.

The above-mentioned gateway apparatus may include a register that sets validity or invalidity of the first storage portion provided for each of the multiple communication channels. Multiple first storage portions are provided in advance, and one or more first storage portions that have been invalid are made valid to deal with the increase of the communication channels. This makes it possible to correspond to the number of the communication channels.

In the above-mentioned gateway apparatus, the search engine may determine an overflow of the first storage portion, when the frame data is transferred to the first storage portion and exceeds the number of pieces of frame data that can be stored in the first storage portion, and outputs an interrupt signal that notifies an error to a controller that controls the gateway apparatus. Overflow in the first storage portion is detected, and the data loss can be detected.

The above-mentioned gateway apparatus may include a timer that counts a period from when the frame data routed is received to when the frame data is forwarded to a forwarding destination communication channel, wherein a controller that controls the gateway apparatus detects a holding time of the frame data with the use of the period counted by the timer. This makes it possible to implement a failsafe process by detecting a holding time of the frame data and discarding the old data.

In the above-mentioned gateway apparatus, the search engine may determine a routing error, when there is no forwarding destination communication channel to which the frame data is forwarded, when a forwarding destination communication channel is invalid, when there is no first storage portion in which the frame data is to be stored, or when the first storage portion is invalid, and outputs an interrupt signal that notifies an error to a controller that controls the gateway apparatus. Accordingly, it is possible to detect the routing error on the gateway apparatus.

The present invention also includes a gateway apparatus that controls a forwarding process of frame data between multiple communication channels, the gateway apparatus including: a routing portion that routes the frame data on the basis whether the frame data is processed on a controller that employs a program control or the frame data is processed on hardware; a search engine that routes the frame data to be processed on hardware on the basis of a forwarding destination; and a first storage portion that temporarily stores the frame data routed.

The above-mentioned gateway apparatus may further include a selector that adjusts timings when multiple pieces of frame data forwarded from the multiple communication channels are input into the search engines. It is therefore possible for multiple communication channels to share the search engine and the first storage portion.

In the above-mentioned gateway apparatus, one search engine and one storage portion may be provided for the multiple communication channels. The above-mentioned gateway apparatus may further include a second storage portion separately provided from the first storage portion to store the frame data routed by the search engine. In the above-mentioned gateway apparatus, the search engine stores the frame data having a high priority in the second storage portion; and the controller acquires the frame data having the high priority from the second storage portion. Accordingly, the data having a high priority can be forwarded to the controller on a priority basis, reducing the holding time of the process on the controller.

In the above-mentioned gateway apparatus, the controller may refer to a data label applied to the frame data to implement a data process, a forwarding process, and a fail safe process. Accordingly, it is possible to control the data process, the forwarding process, and the fail safe process and to utilize the data label effectively.

The above-mentioned gateway apparatus may further include a second arbitration unit that arbitrates first frame data read out of the first storage portion and second frame data output from the controller, when the first frame data and the second frame data are stored in a buffer provided for each forwarding destination. It is therefore possible to implement the forwarding process on the hardware.

The above-mentioned gateway apparatus may further include a protocol converter that implements a protocol conversion of first frame data before stored in the first storage portion and second frame data retrieved from the first storage portion. This enables the frame data to forward, even if the protocols are different on the node of the forwarding source and that of the forwarding destination.

The above-mentioned gateway apparatus may further include a register that stores at least operation setting information of the gateway apparatus and routing setting information. The routing portion may operate according to the operation setting information and the routing setting information. Only the routing portion operates according to the setting information. Accordingly, the search engine or the first storage portion is not stopped during the process, and the frame data routed by the routing portion can be stored in the first storage portion without fail. This does not produce the loss in the frame data.

In the above-mentioned gateway apparatus, the search engine may implement a validity check of map information for routing while searching for the map information or idling. It is therefore possible to confirm the validity of the map information.

In the above-mentioned gateway apparatus, the search engine includes multiple pieces of map information for routing; and the map information is changed according to a state of a control target. This makes it possible to use the map information according to the state of a control target.

In the above-mentioned gateway apparatus, the search engine may retrieve only data necessary for each of the multiple communication channels at the time of retrieving the map information from a memory. Accordingly, only a necessary portion of the data can be renewed.

In the above-mentioned gateway apparatus, the search engine may implement an error check of the data retrieved at the time of retrieving the map information from the memory. It is therefore possible to detect an error in the map information.

In the above-mentioned gateway apparatus, the number of entries may be changed according to a forward control function of the gateway apparatus, the entries being respectively provided for the multiple communication channels and registered as the map information. The gateway apparatus may further include a state monitoring block that selectively operates at least the routing portion and the first storage portion according to a state of a forward control function. Accordingly, it is possible to operate only a functional portion necessary for a forwarding control, thereby reducing the power consumption.

In the above-mentioned gateway apparatus, the search engine may mask an ID number of the frame data at the time of retrieving entry data having a forwarding destination of the frame data received from map information, and detects the entry data of a corresponding communication channel. This makes it possible to shorten the period for searching for the target entry data.

The present invention is not limited to the above-mentioned embodiments, and other embodiments, variations and modifications may be made without departing from the scope of the present invention.

The present invention is based on Japanese Patent Application No. 2005-133443 filed on Apr. 28, 2005 and Japanese Patent Application No. 2006-013230 filed on Jan. 20, 2006, the entire disclosure of which is hereby incorporated by reference.

What is claimed is:

1. A vehicle gateway apparatus that controls a forwarding process of frame data between multiple communication channels, said vehicle gateway apparatus comprising:
    a plurality of storage portions, having transmission storage portions and reception storage portions, provided for each of the multiple communication channels;
    a routing unit that retrieves frame data from a reception storage region in one of the reception storage portions and that divides the frame data into frame data to be sent to a controller and the frame data to be sent to a hardware search engine according to the reception storage region from which the frame data is retrieved, the frame data being divided according to an identification number respectively recorded in the frame data and being respectively stored in the reception storage region in one of the reception storage portions;
    the controller, controlled by software programs, that executes a routing process that receives the frame data sent from the routing unit and transmits the frame data to a transmission storage region in one of the transmission storage portions prepared for a communication channel being used by an entry to which the frame data is sent;
    a first routing map storing portion that stores a plurality of routing maps used by the hardware search engine;
    the hardware search engine, that executes a routing process using a routing map that receives the frame data sent from the routing unit and transmits the frame data to a transmission storage region in one of the transmission storage portions prepared for a communication channel being used by an entry to which the frame data is sent, regardless to the routing process by the controller;
    a first arbitration unit provided for each of the multiple communication channels that inputs frame data transmitted from the controller and frame data transmitted from the hardware search engine, and arbitrates which of the frame data to be stored in each transmission storage portion; and
    a state management portion that retrieves according to a state of the vehicle, a routing map prepared for an initialization time from the first routing map storing portion in the initialization time when an engine of the vehicle is started, and transmits the routing map to the hardware search engine to have the hardware search engine execute a routing using the routing map prepared for the initialization time,
    and when the state of the vehicle is changed and receives the controller's add request to increase a number of the multiple communication channels or a number of entries which transmit and receive the frame data by using the communication channels,
    retrieves a routing map prepared for the time of adding the number of the communication channels or the number of the entries from the first routing map storing portion, and transmits the routing map to have the hardware search engine execute a routing using the routing map prepared for the time of adding the number of the communication channels or the number of entries.

2. The vehicle gateway apparatus as claimed in claim 1, further comprising multiple FIFO memories having multiple stages that are respectively provided for each of the multiple communication channels to temporarily store the frame data routed by the hardware search engine;
    the first arbitration unit that inputs the frame data transmitted from the controller and the frame data retrieved from the multiple FIFO memories.

3. The vehicle gateway apparatus as claimed in claim 2, wherein the hardware search engine respectively provided for each of the multiple communication channels is provided with a routing map used for a channel selection of the frame data.

4. The vehicle gateway apparatus as claimed in claim 3, comprising a second arbitration unit that arbitrates the multiple communication channels, when the frame data routed by the hardware search engine is stored in the multiple FIFO memories.

5. The vehicle gateway apparatus as claimed in claim 4, wherein:
    the second arbitration unit includes a register in which a priority is set for each of the multiple communication channels; and
    the frame data is written into the multiple FIFO memories according to the priority, when multiple pieces of frame data are simultaneously written into the multiple FIFO memories.

6. The vehicle gateway apparatus as claimed in claim 2, comprising a DMA controller that forwards the frame data routed and stored in the multiple FIFO memories to a transmission storage portion prepared for a communication channel being used by an entry to which the frame data is sent.

7. The vehicle gateway apparatus as claimed in claim 2, comprising counter portions that count the number of pieces of frame data stored in each of the multiple FIFO memories.

8. The vehicle gateway apparatus as claimed in claim 7, wherein the hardware search engine outputs an interrupt signal to the controller that controls the vehicle gateway apparatus, when the number of pieces of frame data counted by the counter portion reaches a given number.

9. The vehicle gateway apparatus as claimed in claim 2, comprising a register that sets validity or invalidity of the multiple FIFO memories provided for each of the multiple communication channels.

10. The vehicle gateway apparatus as claimed in claim 2, wherein the hardware search engine determines an overflow of the multiple FIFO memories, when the frame data is transferred to the multiple FIFO memories and exceeds the number of pieces of frame data that can be stored in the multiple FIFO memories, and outputs an interrupt signal that notifies an error to the controller that controls the vehicle gateway apparatus.

11. The vehicle gateway apparatus as claimed in claim 2, wherein the hardware search engine determines a routing error, when there is no forwarding destination communication channel to which the frame data is forwarded, when a forwarding destination communication channel is invalid, when there is no multiple FIFO memories in which the frame data is to be stored, or when the multiple FIFO memories are invalid, and outputs an interrupt signal that notifies an error to the controller that controls the vehicle gateway apparatus.

12. The vehicle gateway apparatus as claimed in claim 2, wherein one hardware search engine and one multiple FIFO memories are provided for the multiple communication channels.

13. The vehicle gateway apparatus as claimed in claim 2, further comprising a parallel buffer separately provided from the multiple FIFO memories to store the frame data routed by the hardware search engine.

14. The vehicle gateway apparatus as claimed in claim 13, wherein:
   the hardware search engine stores the frame data having a high priority in the parallel buffer; and
   the controller acquires the frame data having the high priority from the parallel buffer.

15. The vehicle gateway apparatus as claimed in claim 2, further comprising a protocol converter that implements a protocol conversion of first frame data before stored in the multiple FIFO memories and second frame data retrieved from the multiple FIFO memories.

16. The vehicle gateway apparatus as claimed in claim 1, wherein the hardware search engine comprises:
   a second routing map storing portion that stores a routing map transmitted from the state management portion;
   an address generator that generates an address in the routing map;
   a routing map portion that obtains routing information of the address from the routing map; and
   a comparator that compares a first ID included in the routing information obtained from the routing map and a second ID included in the frame data, obtains a forwarding destination communication channel from the routing map when the first ID matches the second ID.

17. The vehicle gateway apparatus as claimed in claim 1, wherein the hardware search engine discards the frame data having a format that is not registered in the routing map.

18. The vehicle gateway apparatus as claimed in claim 1, wherein the hardware search engine applies an additional piece of data that represents a recorded position of the frame data necessary for forwarding the frame data.

19. The vehicle gateway apparatus as claimed in claim 1, wherein the hardware search engine outputs an interrupt signal to the controller that controls the vehicle gateway apparatus, when there is a routing error at the time of routing the frame data.

20. The vehicle gateway apparatus as claimed in claim 1, wherein the hardware search engine implements an error check of the routing map, when the hardware search engine determines that the frame data should be routed by searching the routing map.

21. The vehicle gateway apparatus as claimed in claim 1, comprising a timer that counts a period from when the frame data routed is received to when the frame data is forwarded to a forwarding destination communication channel,
   wherein the controller that controls the vehicle gateway apparatus detects a holding time of the frame data with the use of the period counted by the timer.

22. The vehicle gateway apparatus as claimed in claim 1, further comprising a selector that adjusts timings when multiple pieces of frame data forwarded via the multiple communication channels are input into the hardware search engines.

23. The vehicle gateway apparatus as claimed in claim 1, wherein the controller refers to a data label applied to the frame data to implement a data process, a forwarding process, and a fail safe process.

24. The vehicle gateway apparatus as claimed in claim 1, further comprising a register that stores at least operation setting information of the vehicle gateway apparatus and routing setting information,
   wherein the routing portion operates according to the operation setting information and the routing setting information.

25. The vehicle gateway apparatus as claimed in claim 1, wherein the hardware search engine implements a validity check of map information for routing while searching for the map information or idling.

26. The vehicle gateway apparatus as claimed in claim 25, wherein the number of entries is changed according to a forward control function of the vehicle gateway apparatus, the entries being respectively provided for the multiple communication channels and registered as the map information.

27. The vehicle gateway apparatus as claimed in claim 1, wherein the state management portion retrieves only data necessary for each of the multiple communication channels at the time of retrieving the map information from the first routing map storing portion.

28. The vehicle gateway apparatus as claimed in claim 27, wherein the hardware search engine implements an error check of the map information received from the state management portion.

29. The vehicle gateway apparatus as claimed in claim 1, further comprising a state monitoring block that selectively operates at least the routing portion and the multiple FIFO memories according to a state of a forward control function.

30. The vehicle gateway apparatus as claimed in claim 1, wherein the hardware search engine masks an ID number of the frame data at the time of retrieving entry data having a forwarding destination of the frame data received from map information, and detects the entry data of a corresponding communication channel.

31. A routing method that controls a forwarding process of frame data between multiple communication channels, the routing method comprising:
   retrieving, according to a state of a vehicle, a routing map prepared for an initialization time from a first routing map storing portion in the initialization time when an engine of the vehicle is started;

transmitting the routing map prepared for the initialization time to a hardware search engine to execute a routing using the routing map;

retrieving a routing map prepared for a time of adding a number of the multiple communication channels or a number of entries from the first routing map storing portion in the time when the state of the vehicle is changed and receives a controller's add request to increase the number of the communication channels or the number of entries which transmit and receive frame data by using the communication channels;

transmitting the routing map prepared for the time of adding the number of the communication channels or the number of the entries to the hardware search engine to execute a routing using the routing map;

retrieving frame data from a reception storage region in one of reception storage portions;

dividing the frame data into frame data to be sent to the controller and the frame data to be sent to the hardware search engine according to the reception storage region from which the frame data is retrieved, the frame data being divided according to an identification number respectively recorded in the frame data and being respectively stored in the reception storage region in one of the reception storage portions;

executing a routing process by the controller, controlled by software programs, that receives the divided frame data and transmits the frame data to a transmission storage region in one of transmission storage portions prepared for a communication channel being used by an entry to which the frame data is sent;

executing a routing process by the hardware search engine using the routing map prepared for the initialization time or the routing map prepared for the time of adding the number of the communication channels or the number of the entries, that receives the divided frame data and transmits the frame data to a transmission storage region in one of the transmission storage portions prepared for a communication channel being used by an entry to which the frame data is sent, regardless to the routing process by the controller; and receiving the frame data transmitted from the controller and the frame data transmitted from the hardware search engine, and selecting the frame data to be stored in the transmission storage portions.

* * * * *